US010101996B2

United States Patent
Kitamura

(10) Patent No.: US 10,101,996 B2
(45) Date of Patent: Oct. 16, 2018

(54) ARITHMETIC PROCESSING APPARATUS, INFORMATION PROCESSING APPARATUS, AND METHOD OF CONTROLLING INFORMATION PROCESSING APPARATUS

(71) Applicant: FUJITSU LIMITED, Kawasaki-shi, Kanagawa (JP)

(72) Inventor: Yasuhiro Kitamura, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 268 days.

(21) Appl. No.: 15/053,431

(22) Filed: Feb. 25, 2016

(65) Prior Publication Data

US 2016/0266898 A1 Sep. 15, 2016

(30) Foreign Application Priority Data

Mar. 10, 2015 (JP) ................................ 2015-046691

(51) Int. Cl.
*G06F 3/00* (2006.01)
*G06F 9/30* (2018.01)

(52) U.S. Cl.
CPC .................... *G06F 9/3001* (2013.01)

(58) Field of Classification Search
CPC ............ G06F 13/4022; G06F 13/4031; G06F 3/0635; G06F 13/26; H04L 47/24; H04L 47/2433; H04L 47/2458; H04L 47/2466
USPC ..... 710/38–40, 316–317, 240–244, 100, 310
See application file for complete search history.

(56) References Cited

U.S. PATENT DOCUMENTS

| | | | | |
|---|---|---|---|---|
| 5,628,018 A | * | 5/1997 | Matsuzaki | G06F 13/26 710/260 |
| 5,930,256 A | * | 7/1999 | Greene | H04L 12/5601 370/380 |
| 6,721,324 B1 | * | 4/2004 | Shinohara | H04L 49/1576 370/395.1 |
| 2005/0091432 A1 | * | 4/2005 | Adams | G06F 13/4022 710/100 |
| 2007/0011382 A1 | * | 1/2007 | Roever | G06F 13/1615 710/240 |
| 2008/0162770 A1 | * | 7/2008 | Titiano | G06F 1/3203 710/309 |

(Continued)

FOREIGN PATENT DOCUMENTS

| | | |
|---|---|---|
| JP | 2009-194510 | 8/2009 |
| JP | 2013-135387 | 7/2013 |

*Primary Examiner* — Faisal M Zaman
*Assistant Examiner* — Kim T Huynh
(74) *Attorney, Agent, or Firm* — Fujitsu Patent Center

(57) ABSTRACT

An arithmetic processing apparatus includes multiple selection circuits that are connected in series, wherein at least one selection circuit, the at least one selection circuit being served as a first selection circuit, includes a selection unit that selects a first input unit from two or more input units each receiving, from a source or a selection circuit in a previous stage, data and an identifier of a sender of the data; based on the two or more identifiers, and priority information indicating respective priorities for multiple sources connected to: a selection circuit upstream to the first selection circuit; and the first selection circuit; an update unit that updates, in the priority information, a priority for a first source indicated by a first identifier being received by the first input unit; and a transfer unit that transfers data and the first identifier passed through the first input unit, to a destination.

12 Claims, 19 Drawing Sheets

(56) References Cited

U.S. PATENT DOCUMENTS

| | | | |
|---|---|---|---|
| 2009/0055566 A1* | 2/2009 | Reinig | G06F 13/1615 710/243 |
| 2009/0132736 A1* | 5/2009 | Hasan | G06F 13/1605 710/56 |
| 2009/0307408 A1* | 12/2009 | Naylor | G06F 13/4022 710/317 |
| 2010/0325327 A1* | 12/2010 | Marietta | G06F 13/1642 710/240 |
| 2011/0149735 A1* | 6/2011 | Mangano | G06F 13/368 370/235 |
| 2012/0320751 A1* | 12/2012 | Zhu | H04L 47/628 370/236 |
| 2013/0036336 A1* | 2/2013 | Kitamura | G06F 11/1004 714/712 |
| 2013/0163608 A1* | 6/2013 | Nagatsuka | G06F 13/36 370/419 |
| 2015/0220470 A1* | 8/2015 | Chen | H04L 49/109 710/105 |

\* cited by examiner

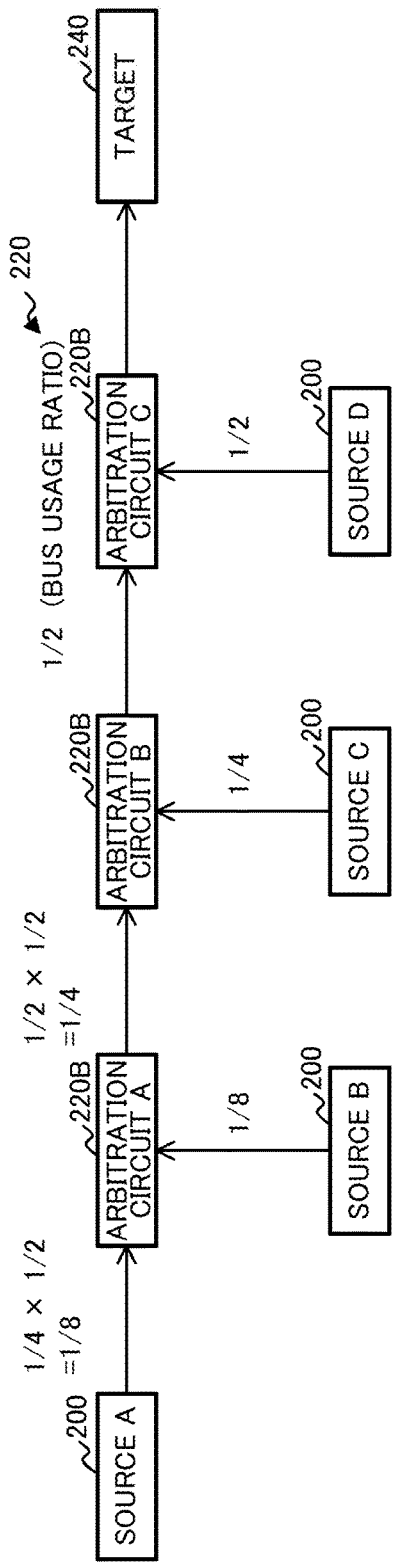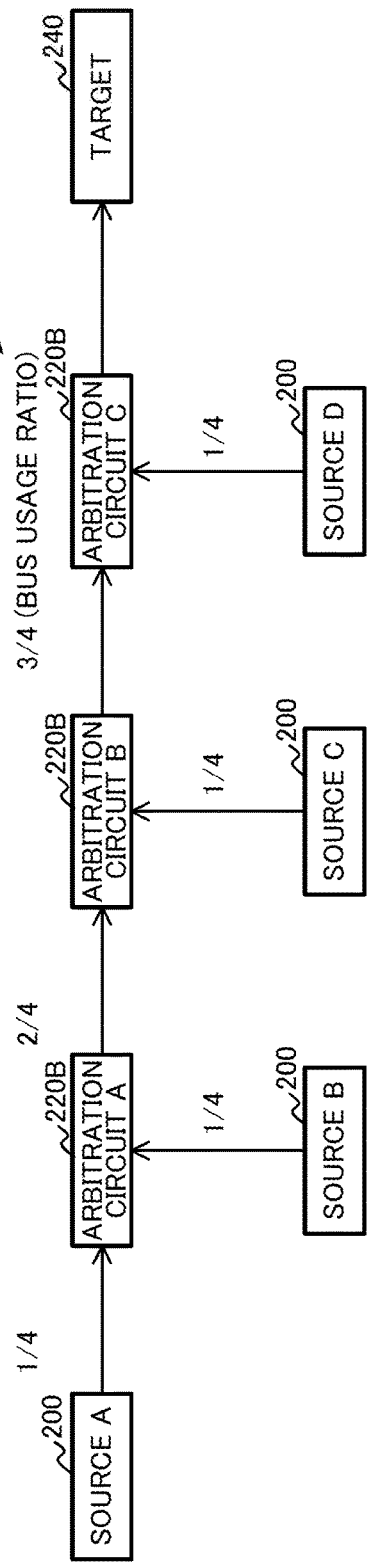

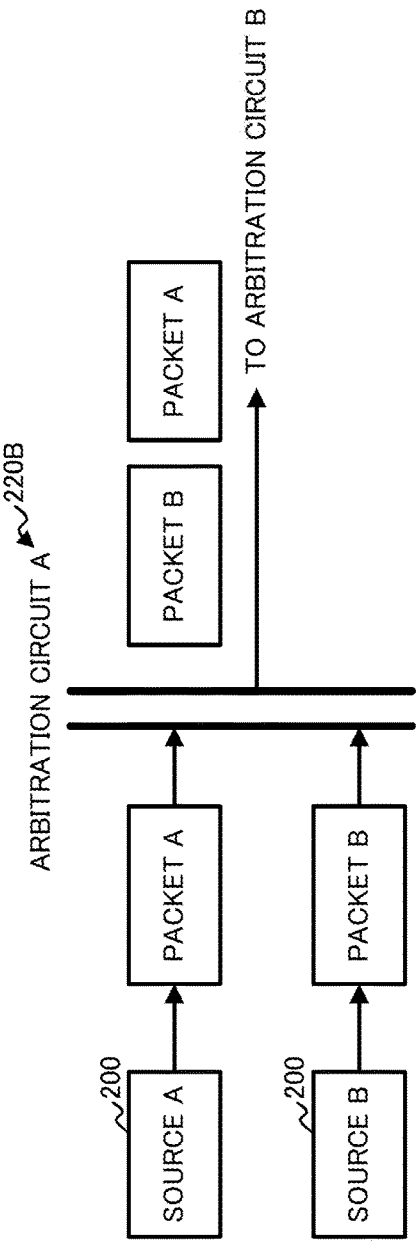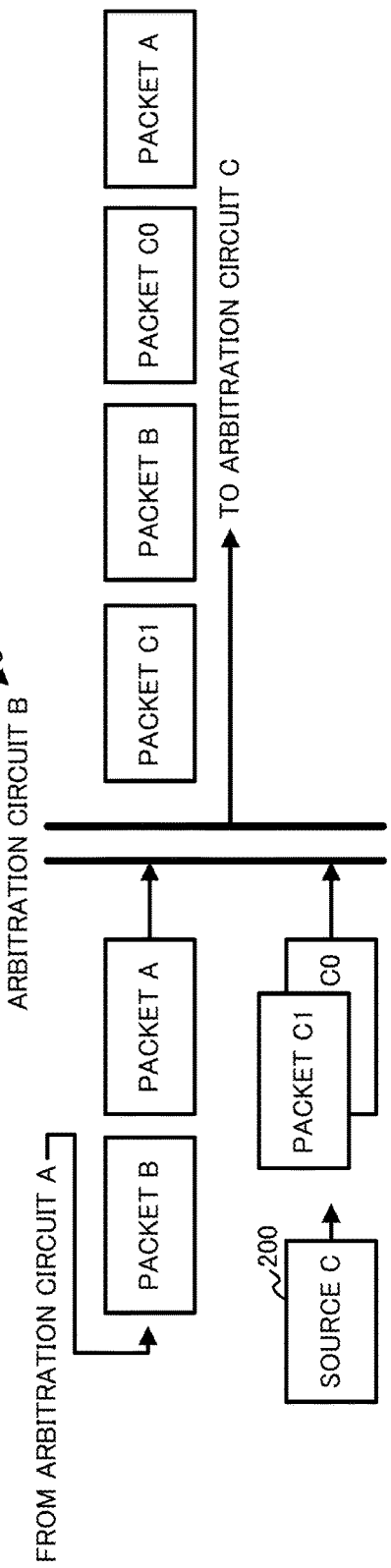

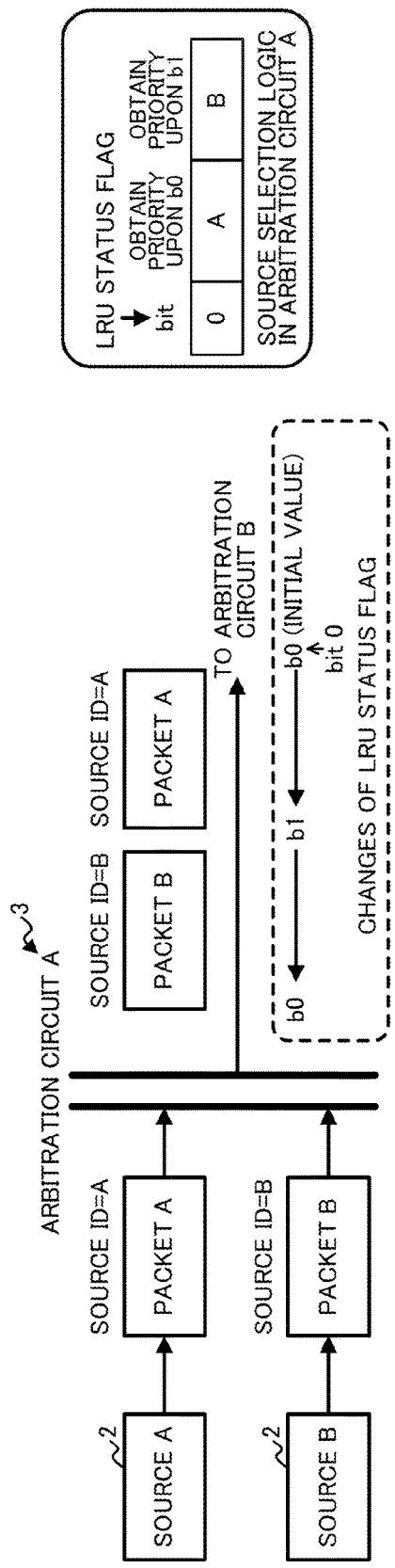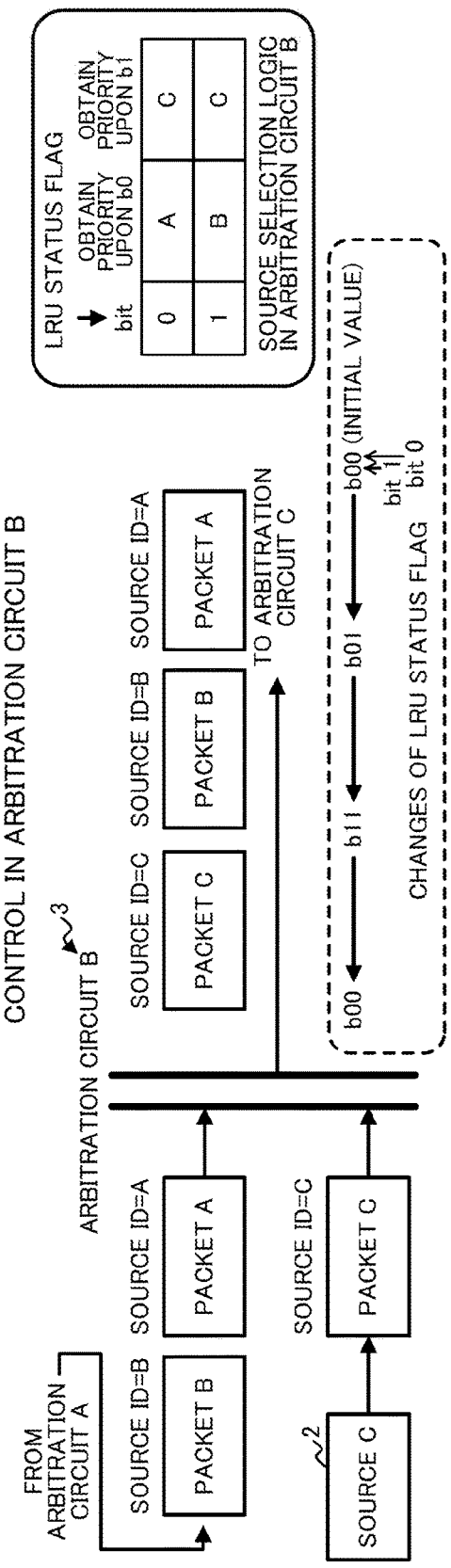

FIG. 8A
FOR ARBITRATION CIRCUIT 220B

| SOURCE A | A0 | | A1 | | A2 | | A3 | |
|---|---|---|---|---|---|---|---|---|
| SOURCE B | | B0 | | B1 | | B2 | | |
| MERGER OF THE ABOVE | A0 | B0 | A1 | B1 | A2 | | | |
| SOURCE C | C0 | | C1 | | C2 | C3 | C4 | |
| LRU OF ARBITRATION CIRCUIT B | 0 | | 1 | | 0 | 1 | 0 | 1 |
| TARGET (ARBITRATION CIRCUIT C) | A0 | B0 | C0 | A1 | C1 | C2 | B1 | C3 |

A:B:C = 1:1:2

FIG. 8B
FOR ARBITRATION CIRCUIT 3

| SOURCE A | A0 | | A1 | | A2 | | A3 | | A4 |
|---|---|---|---|---|---|---|---|---|---|
| SOURCE B | | B0 | | B1 | | B2 | | B3 | |
| MERGER OF THE ABOVE | A0 | B0 | A1 | B1 | A2 | B2 | A3 | | |
| SOURCE C | C0 | | C1 | | C2 | | | | |
| LRU OF ARBITRATION CIRCUIT B | 00 | | 01 | 11 | 00 | 11 | 01 | 11 | |
| TARGET (ARBITRATION CIRCUIT 3) | A0 | B0 | C0 | A1 | B1 | C1 | A2 | B2 | |

A:B:C = 1:1:1

FIG. 12A
SOURCE SELECTION LOGIC IN ARBITRATION CIRCUIT A

LRU STATUS FLAG

| bit | OBTAIN PRIORITY UPON b0 | OBTAIN PRIORITY UPON b1 |
|---|---|---|
| 0 | A | B |
| 1 | A | C |
| 2 | B | C |

FIG. 12B
SOURCE SELECTION LOGIC IN ARBITRATION CIRCUIT B

| bit | OBTAIN PRIORITY UPON b0 | OBTAIN PRIORITY UPON b1 |
|---|---|---|
| 0 | A | D |
| 1 | A | E |
| 2 | B | D |
| 3 | B | E |
| 4 | C | D |
| 5 | C | E |
| 6 | D | E |

FIG. 12C
SOURCE SELECTION LOGIC IN ARBITRATION CIRCUIT C

| bit | OBTAIN PRIORITY UPON b0 | OBTAIN PRIORITY UPON b1 |
|---|---|---|
| 0 | A | F |
| 1 | A | G |
| 2 | B | F |
| 3 | B | G |
| 4 | C | F |
| 5 | C | G |
| 6 | D | F |
| 7 | D | G |
| 8 | E | F |
| 9 | E | G |
| 10 | F | G |

FIG. 13
EXAMPLE OF ARBITRATION OPERATIONS IN ARBITRATION CIRCUIT A

| CYCLE | | | 1 | 2 | 3 | 4 | 5 | 6 | 7 | 8 |
|---|---|---|---|---|---|---|---|---|---|---|
| SOURCE A | ARBITRATION PARTICIPATION | | 1 | 1 | 1 | 1 | 1 | 1 | 1 | 1 |
| | DATA | | A0 | A1 | A1 | A1 | A2 | A2 | A2 | A3 |
| | PRIORITY OBTAINMENT | | 1 | | | 1 | | | 1 | |
| SOURCE B | ARBITRATION PARTICIPATION | | 1 | 1 | 1 | 1 | 1 | 1 | 1 | 1 |
| | DATA | | B0 | B0 | B1 | B1 | B1 | B2 | B2 | B2 |
| | PRIORITY OBTAINMENT | | | 1 | | | 1 | | | 1 |
| SOURCE C | ARBITRATION PARTICIPATION | | 1 | 1 | 1 | 1 | 1 | 1 | 1 | 1 |
| | DATA | | C0 | C0 | C0 | C1 | C1 | C1 | C2 | C2 |
| | PRIORITY OBTAINMENT | | | | 1 | | | 1 | | |

| LRU REGISTER OF ARBITRATION CIRCUIT A | OBTAIN PRIORITY UPON b0 | OBTAIN PRIORITY UPON b1 |
|---|---|---|
| | A | B |
| | | C |
| | B | C |

| | | | | | | | |
|---|---|---|---|---|---|---|---|
| 0 | 1 | 0 | 0 | 1 | 0 | 0 | 1 |
| 0 | 1 | 1 | 0 | 1 | 1 | 0 | 1 |
| 0 | 0 | 1 | 0 | 0 | 1 | 0 | 0 |

| TRANSMISSION BUS OF ARBITRATION CIRCUIT A | ARBITRATION PARTICIPATION | | 1 | 1 | 1 | 1 | 1 | 1 | 1 |
|---|---|---|---|---|---|---|---|---|---|
| | DATA | | A0 | B0 | C0 | A1 | A1 | A1 | B1 |
| | PRIORITY OBTAINMENT | | 1 | 1 | 1 | | | 1 | 1 |
| | BUFFER A | | | | | | B1 | B1 | C1 |
| | BUFFER B | | | | | | | C1 | A2 |
| | BUFFER C | | | | | | | | |

FIG. 14
EXAMPLE OF ARBITRATION OPERATIONS IN
ARBITRATION CIRCUIT B

| | | CYCLE | 1 | 2 | 3 | 4 | 5 | 6 | 7 | 8 |
|---|---|---|---|---|---|---|---|---|---|---|
| TRANSMI-SSION BUS OF ARBITRA-TION CIRCUIT A | | ARBITRATION PARTICIPATION | | 1 | 1 | 1 | 1 | 1 | 1 | 1 |
| | | DATA | | A0 | B0 | C0 | A1 | A1 | A1 | B1 |
| | | PRIORITY OBTAINMENT | | 1 | 1 | 1 | | | 1 | 1 |
| | | BUFFER A | | | | | | B1 | B1 | C1 |
| | | BUFFER B | | | | | | | C1 | A2 |
| | | BUFFER C | | | | | | | | |

| | | | 1 | 2 | 3 | 4 | 5 | 6 | 7 | 8 |
|---|---|---|---|---|---|---|---|---|---|---|
| SOURCE D | | ARBITRATION PARTICIPATION | 1 | 1 | 1 | 1 | 1 | 1 | 1 | 1 |
| | | DATA | D0 | D1 | D1 | D1 | D1 | D1 | D2 | D2 |
| | | PRIORITY OBTAINMENT | 1 | | | | | 1 | | |
| SOURCE E | | ARBITRATION PARTICIPATION | 1 | 1 | 1 | 1 | 1 | 1 | 1 | 1 |
| | | DATA | E0 | E0 | E0 | E0 | E0 | E1 | E1 | E1 |
| | | PRIORITY OBTAINMENT | | | | | 1 | | | |

| | OBTAIN PRIORITY UPON b0 | OBTAIN PRIORITY UPON b1 | 1 | 2 | 3 | 4 | 5 | 6 | 7 | 8 |
|---|---|---|---|---|---|---|---|---|---|---|
| LRU REGISTER OF ARBITRA-TION CIRCUIT B | A | D | 0 | 0 | 1 | 1 | 1 | 1 | 0 | 1 |
| | | E | 0 | 0 | 1 | 1 | 1 | 0 | 0 | 1 |
| | B | D | 0 | 0 | 0 | 1 | 1 | 1 | 0 | 0 |
| | | E | 0 | 0 | 0 | 1 | 1 | 0 | 0 | 0 |
| | C | D | 0 | 0 | 0 | 0 | 1 | 1 | 0 | 0 |
| | | E | 0 | 0 | 0 | 0 | 1 | 0 | 0 | 0 |
| | D | E | 0 | 1 | 1 | 1 | 1 | 0 | 1 | 1 |

| | | | 1 | 2 | 3 | 4 | 5 | 6 | 7 | 8 |
|---|---|---|---|---|---|---|---|---|---|---|
| TRANSMI-SSION BUS OF ARBITRA-TION CIRCUIT C | | ARBITRATION PARTICIPATION | | 1 | 1 | 1 | 1 | 1 | 1 | 1 |
| | | DATA | | D0 | A0 | B0 | C0 | E0 | D1 | D1 |
| | | PRIORITY OBTAINMENT | | 1 | 1 | 1 | 1 | 1 | | |
| | | BUFFER A | | | | | | | | A1 |
| | | BUFFER B | | | | | | | | |
| | | BUFFER C | | | | | | | | |

FIG. 15
EXAMPLE OF ARBITRATION OPERATIONS IN ARBITRATION CIRCUIT C

| CYCLE | | | 1 | 2 | 3 | 4 | 5 | 6 | 7 | 8 |
|---|---|---|---|---|---|---|---|---|---|---|
| TRANSMISSION BUS OF ARBITRATION CIRCUIT B | ARBITRATION PARTICIPATION | | | 1 | 1 | 1 | 1 | 1 | 1 | 1 |
| | DATA | | | D0 | A0 | B0 | C0 | E0 | D1 | D1 |
| | PRIORITY OBTAINMENT | | | 1 | 1 | 1 | 1 | 1 | | |
| | BUFFER A | | | | | | | | | A1 |
| | BUFFER B | | | | | | | | | |
| | BUFFER C | | | | | | | | | |

| | ARBITRATION PARTICIPATION | | 1 | 1 | 1 | 1 | 1 | 1 | 1 | 1 |
|---|---|---|---|---|---|---|---|---|---|---|
| SOURCE F | DATA | | F0 | F1 | F1 | F1 | F1 | F1 | F1 | F1 |
| | PRIORITY OBTAINMENT | | 1 | | | | | | | 1 |
| SOURCE G | ARBITRATION PARTICIPATION | | 1 | 1 | 1 | 1 | 1 | 1 | 1 | 1 |
| | DATA | | G0 | G0 | G0 | G0 | G0 | G0 | G0 | G1 |
| | PRIORITY OBTAINMENT | | | | | | | | 1 | |

| | | OBTAIN PRIORITY UPON b0 | OBTAIN PRIORITY UPON b1 | | | | | | | | |
|---|---|---|---|---|---|---|---|---|---|---|---|
| LRU REGISTER OF ARBITRATION CIRCUIT C | A | | F | 0 | 0 | 0 | 1 | 1 | 1 | 1 | 1 |
| | | | G | 0 | 0 | 0 | 1 | 1 | 1 | 1 | 0 |
| | B | | F | 0 | 0 | 0 | 0 | 1 | 1 | 1 | 1 |
| | | | G | 0 | 0 | 0 | 0 | 1 | 1 | 1 | 0 |
| | C | | F | 0 | 0 | 0 | 0 | 0 | 1 | 1 | 1 |
| | | | G | 0 | 0 | 0 | 0 | 0 | 1 | 1 | 0 |
| | D | | F | 0 | 0 | 1 | 1 | 1 | 1 | 1 | 1 |
| | | | G | 0 | 0 | 1 | 1 | 1 | 1 | 1 | 0 |
| | E | | F | 0 | 0 | 0 | 0 | 0 | 0 | 1 | 1 |
| | | | G | 0 | 0 | 0 | 0 | 0 | 0 | 1 | 0 |
| | F | | G | 0 | 1 | 1 | 1 | 1 | 1 | 1 | 0 |

| TARGET | DATA | | | F0 | D0 | A0 | B0 | C0 | E0 | G0 |

FIG. 18
SOURCE SELECTION LOGIC WHEN THERE ARE LRU
STATUS FLAGS FOR ALL SOURCES

| LRU STATUS FLAG bit | OBTAIN PRIORITY UPON b0 | OBTAIN PRIORITY UPON b1 |
|---|---|---|
| 0 | A | B |
| 1 | A | C |
| 2 | A | D |
| 3 | A | E |
| 4 | A | F |
| 5 | A | G |
| 6 | B | C |
| 7 | B | D |
| 8 | B | E |
| 9 | B | F |
| 10 | B | G |
| 11 | C | D |
| 12 | C | E |
| 13 | C | F |
| 14 | C | G |
| 15 | D | E |
| 16 | D | F |
| 17 | D | G |
| 18 | E | F |
| 19 | E | G |
| 20 | F | G |

ARITHMETIC PROCESSING APPARATUS, INFORMATION PROCESSING APPARATUS, AND METHOD OF CONTROLLING INFORMATION PROCESSING APPARATUS

CROSS-REFERENCE TO RELATED APPLICATION

This application is based upon and claims the benefit of priority of the prior Japanese Patent Application No. 2015-046691, filed on Mar. 10, 2015, the entire contents of which are incorporated herein by reference.

FIELD

The present invention relates to an arithmetic processing apparatus, an information processing apparatus, and a method of controlling an information processing apparatus.

BACKGROUND

In an information processing apparatus, such as a server, multiple processors, e.g., central processing units (CPUs), may be provided as arithmetic processing apparatuses and may be connected to each other. In such an information processing apparatus, CPUs may communicate to each other for embodying parallel computing (parallel processing), for example.

As exemplified in FIG. 19, in an information processing apparatus 100, data, e.g., packets, sent from another CPU 200 or another apparatus that is not illustrated (hereinafter, referred to as the "sender" or "source") are received and confirmed by a receiving unit 210 at an interface of a destination CPU 200. The received and confirmed packets are then arbitrated by a router unit 220, pass through a cache unit 230, and are notified to a core unit 240 as a processor core, which serves as an arithmetic processing unit. While only one core unit 240 is depicted in the CPU 200 in FIG. 19, each CPU 200 may include multiple core units 240.

In the meantime, a related technique is known in which a communication control apparatus selects an output packet based on priority information provided in packets, and updates the priority information of packets that are not selected, based on weight information (refer to Patent Document 1, for example).

Another related technique is also known in which each of multiple CPUs attaches latency information corresponding to a destination hardware resource in a routing table of that CPU, to a transmission packet (refer to Patent Document 2, for example). In this technique, upon receiving multiple packets, each of multiple crossbars carries out a priority arbitration process for preferentially sending a packet having a greater latency to the destination hardware resource.

Patent Document 1: Japanese Laid-Open Patent Publication No. 2013-135387
Patent Document 2: Japanese Laid-Open Patent Publication No. 2009-194510

Preferably, an arbitration in the router unit 220 is carried out in an equalized manner for all interfaces (e.g., sources). For example, when the router unit 220 arbitrates among (selects one from) packets from sources using the genuine least recently used (LRU) scheme or the like, arbitration participation signals from the sources concentrate on a single point with an increase in the number of sources, which results in an increase in the size of the circuit for carrying out the LRU arbitration (selection).

SUMMARY

In one aspect, an arithmetic processing apparatus of this embodiment includes a plurality of selection circuits that are connected in series. At least one selection circuit of the plurality of selection circuits, the at least one selection circuit being served as a first selection circuit, includes a plurality of input units that are connected to a source or a selection circuit in a previous stage to receive, from the source or the selection circuit in the previous stage, data and an identifier of a sender of the data. The at least one selection circuit also includes a selection unit that selects a first input unit from two or more input units each receiving data and an identifier, based on the two or more identifiers, and priority information. The priority information indicates respective priorities for a plurality of sources connected to: a selection circuit upstream to the first selection circuit; and the first selection circuit. The at least one selection circuit also includes an update unit that updates, in the priority information, a priority for a first source indicated by a first identifier being received by the first input unit. The at least one selection circuit further includes a transfer unit that transfers data and the first identifier passed through the first input unit, to a destination.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3A is a diagram illustrating an example in which the bus usage ratios are equalized among arbitration circuits in the router unit depicted in FIG. 2;
FIG. 3B is a diagram illustrating an example in which the bus usage ratios are equalized among sources in the router unit depicted in FIG. 2;
FIG. 6A is a diagram illustrating exemplary operations of the arbitration circuit A depicted in FIG. 2;
FIG. 6B is a diagram illustrating exemplary operations of the arbitration circuit B depicted in FIG. 2;
FIG. 7A is a diagram illustrating exemplary operations of the arbitration circuit A depicted in FIG. 5;
FIG. 7B is a diagram illustrating exemplary operations of the arbitration circuit B depicted in FIG. 5;
FIG. 8A is a diagram illustrating one example of a timing chart of arbitrations by the arbitration circuit depicted in FIGS. 6A and 6B;
FIG. 8B is a diagram illustrating one example of a timing chart of arbitrations by the arbitration circuit depicted in FIGS. 7A and 7B.

FIGS. 12A to 12C are diagrams illustrating one example of a source selection logic in the arbitration circuits A-C depicted in FIG. 9, respectively;

FIG. 13 is a diagram illustrating one example of a timing chart of arbitrations by the arbitration circuit A depicted in FIG. 9;

FIG. 14 is a diagram illustrating one example of a timing chart of arbitrations by the arbitration circuit B depicted in FIG. 9;

FIG. 15 is a diagram illustrating one example of a timing chart of arbitrations by the arbitration circuit C depicted in FIG. 9;

FIG. 18 is a diagram illustrating one example of a source selection logic in a configuration wherein an arbitration circuit has LRU status flags for all sources.

DESCRIPTION OF EMBODIMENTS

Hereinafter, an embodiment of the present invention will be described with reference to the drawings. It is to be noted that, however, the embodiment described below is merely exemplary, and it is not intended that various modifications and applications of the techniques are excluded. In other words, the present embodiment may be practiced in a various modifications without departing from the extent thereof. Note that elements referenced to with the same reference symbols denote the same or similar elements, unless otherwise stated.

(1) Comparative Example

Figure 1:
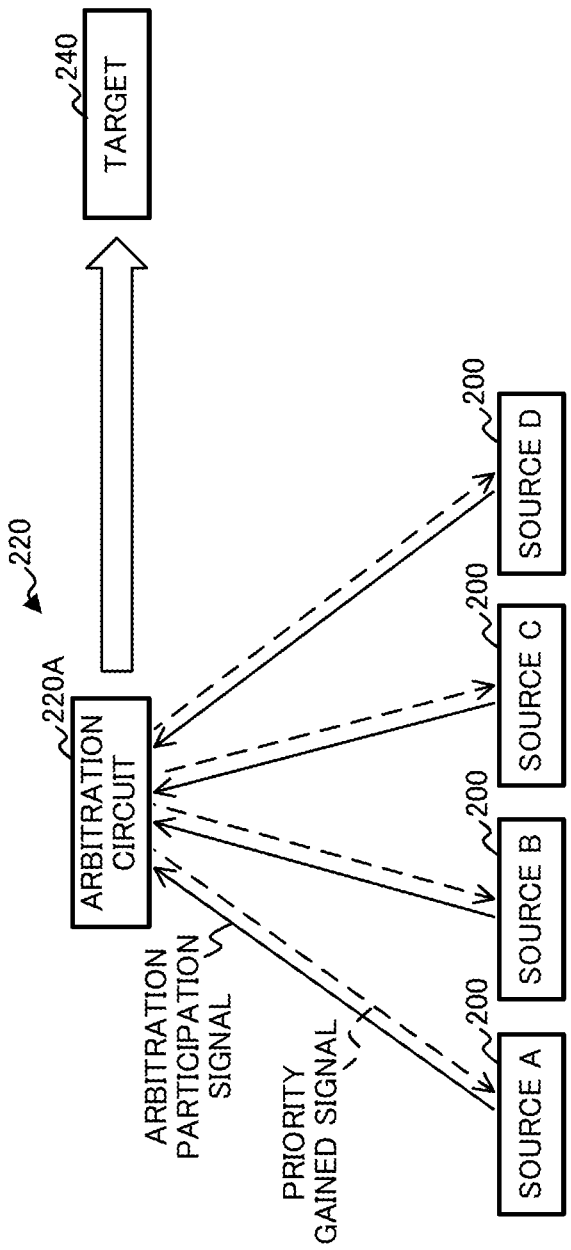
FIG. 1 is a diagram illustrating one example of a router unit depicted in FIG. 19.
Figure 19:
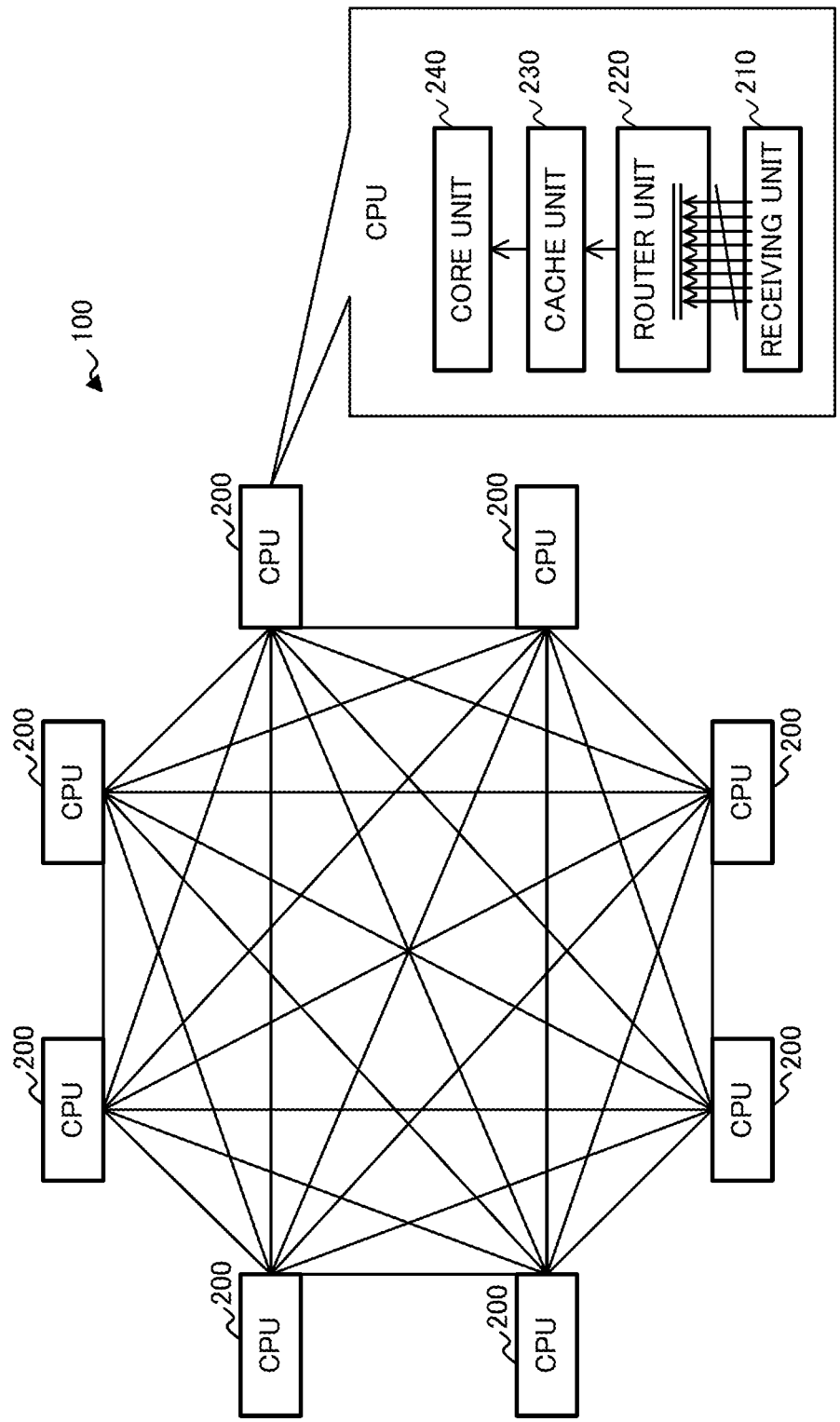
FIG. 19 is a diagram illustrating an exemplary configuration of an information processing apparatus.

Firstly, a comparative example of one embodiment will be described with reference to FIG. 1 to FIGS. 3A and 3B. A router unit 220 depicted in FIG. 19 may include an arbitration circuit 220A employing the centralized control scheme, as depicted in FIG. 1, for example. Hereinafter, the senders of packets, such as the CPU 200 or another apparatus (not illustrated) are referred to as the sources 200 or sources A-D (refer to FIG. 1), and the destinations of the packets, such as a core unit 240 (or a cache unit 230), is referred to as the target 240. The router unit 220 depicted in FIG. 1 includes one arbitration circuit (arbitrator) 220A, and is a circuit that receives packets from the multiple sources A-D, arbitrates among the received packets at the arbitration circuit 220A, and transfers a selected packet to one target 240.

In the arbitration circuit 220A depicted in FIG. 1, upon arbitrating among (selecting one from) packets from each source 200 using the genuine LRU scheme or the like, arbitration participation signals from the sources 200 concentrate on a single point with an increase in the number of sources 200. This may incur an increase in the delay of a logic circuit for the LRU arbitration (selection), and may complicate the timing design. Since a logic circuit (including a circuit for sending priority gained signals) is provided in each source 200 for selecting the winner bus (source 200) in an arbitration, the area for wiring is increased, which results in an increase in the circuit size.

Figure 2:
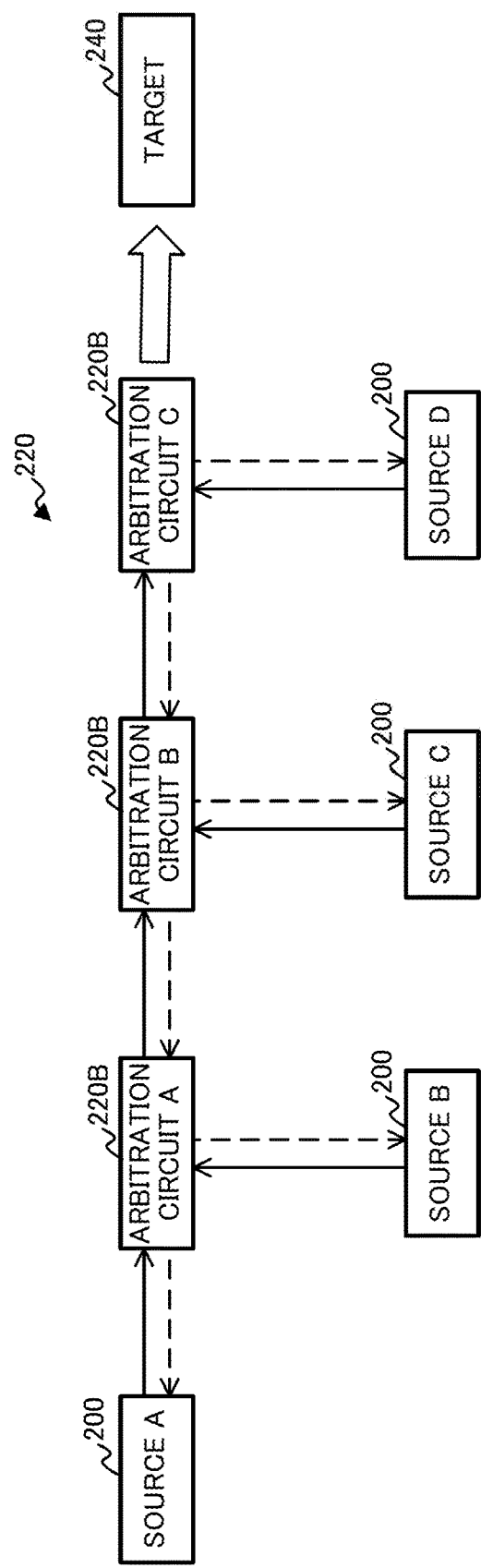
FIG. 2 is a diagram illustrating another example of the router unit depicted in FIG. 19.

To solve this issue, it is considered that a router unit 220 may include multiple arbitration circuits 220B employing the serial multi-stage arbitration scheme depicted in FIG. 2, for example. Instead of the single-stage arbitration circuit 220A as depicted in FIG. 1, the router unit 220 depicted in FIG. 2 includes arbitration circuits (arbitrators) 220B in multiple stages which are connected (coupled) in series. Hereinafter, the arbitration circuits 220B may be referred to as the arbitration circuits A-C. In the router unit 220 depicted in FIG. 2, the multiple sources A-D are divided into groups (which correspond to the arbitration circuits A-C), and the winner (the source A or B) of the group of the arbitration circuit A, for example, is made to participate in an arbitration of the group (the source C) of the arbitration circuit B in the next stage.

Since it is possible to reduce the number of participant sources 200 in an arbitration little by little in each stage, the load on each arbitration circuit 220B in the router unit 220 is reduced, as compared to the load on the arbitration circuit 220A. Hence, the design of the arbitration circuits 220B can be made easier. Since a packet is transferred on the reduced number of buses that participate in an arbitration, the size reduction of the circuit can also be achieved.

In the router unit 220 depicted in FIG. 2, however, when an attempt is made to equalize the bus usage ratios among the arbitration circuits 220B, sources 200 closer to the target 240 have higher bus usage ratios. For example, if a selection is made such that sources 200 participating in an arbitration are selected equally using the simple LRU scheme or the like in each arbitration circuit 220B, sources 200 closer to the target 240 occupy more buses than source 200 distant from the target 240 (refer to FIG. 3A).

Hence, as exemplified in FIG. 3B, a mechanism for equalizing the bus usage ratios of the sources 200 is preferred so as to equalize (eliminate impartiality) of arbitrations for all sources 200.

Note that a related technique is known for a parallel computer system wherein multiple calculation nodes are connected in series, in which a router provided in each calculation node transfers a packet by attaching the merger count to the packet (refer to Japanese Laid-Open Patent Publication No. 2012-198819, for example).

In this technique for the parallel computer system, when multiple packets are received, the router obtains the merger count stored in each packet and updates the merger count according to the number of received packets. The router then selects a packet to be sent to a router in the next stage, from the received packets, based on the updated merger count, stores the updated merger count in the selected packet, and sends the packet. In this manner, the bandwidth usage ratios can be equalized among the sources of packets in the parallel computer system.

In this parallel computer system technique, however, processes are carried out for comparing the merger counts and modifying the updated merger count in the packet. Accordingly, when this technique is applied to an internal component (e.g., the router unit 220) of the processor, it is difficult to reduce the size of logic circuit and to carry out an arbitration with a smaller gate delay. The above-described related techniques (refer to Patent Documents 1 and 2 described above, for example) also have this disadvantage.

(2) Embodiment

(2-1) Information Processing Apparatus

Thus, in an information processing apparatus in accordance with one embodiment, each arithmetic processing apparatus may include a plurality of selection circuits that are connected in series. Since one or more selection circuits of the multiple selection circuits carry out processes that will be described below, an increase in the circuit size can be suppressed and the bus (bandwidth) usage ratios among the sources can be adjusted appropriately, for example, in an equalized manner.

For example, in one or more selection circuits, data and identifiers for identifying the senders of the data are inputted into input ports. The one or more selection circuits then select a first input unit from two or more input units to which data and the respective identifiers are inputted, based on the two or more identifiers and priority information. The data and a first identifier received at the first input unit then are transferred to a transfer destination. Further, in the priority information, the priority for a first source indicated by the first identifier received at the first input unit is updated. As used therein, the priority information indicates the priorities for multiple sources connected to: a selection circuit upstream to this selection circuit (first selection circuit); and the first selection circuit. As described above, in the information processing apparatus 1 in accordance with one embodiment, one or more selection circuits can select a first input unit, considering all of the sources, data from which may be merged in the first selection circuit. Hereinafter, the information processing apparatus 1 will be described.

Figure 4:
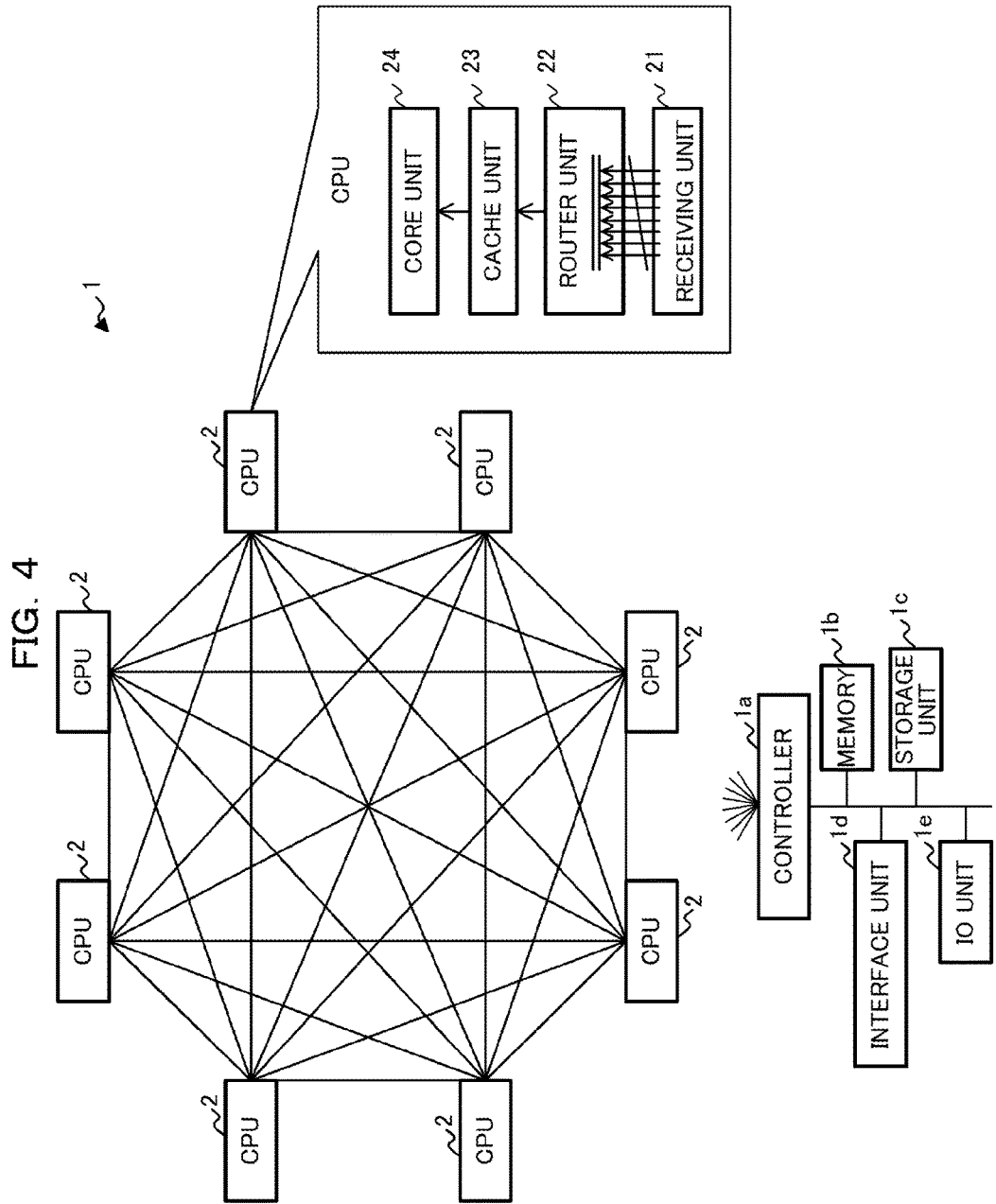
FIG. 4 is a diagram illustrating an exemplary configuration of an information processing apparatus in accordance with one embodiment.

As exemplified in FIG. 4, the information processing apparatus 1 in accordance with one embodiment may include multiple CPUs 2, a controller 1a, a memory 1b, a storage unit 1c, an interface unit 1d, and an input/output (IO) unit 1e. The information processing apparatus 1 may be a computer, such as a server or a personal computer (PC), for example. Preferably, the information processing apparatus 1 is a computer in which an arithmetic processing apparatus receives data from multiple input sources (e.g., remote arithmetic processing apparatuses or other apparatuses), and is a parallel computer or the like, for example.

The CPUs 2 represent examples of processors (arithmetic processing apparatuses) that carry out various types of controls and computations. Each CPU 2 is connected to each of the other CPUs 2 and the controller 1a, and can embody various functions by executing a program stored in the memory 1b, the storage unit 1c, a read only memory (ROM; not illustrated), or the like. Each CPU 2 in accordance with one embodiment can embody parallel computing (parallel processing) in cooperation with the other CPUs 2, for example.

The controller 1a is a controller that carries out at least one control (e.g., communication control) among the CPUs 2, among the CPUs 2 and the memory 1b, or among the CPUs 2 and the other blocks 1c-1e. The controller 1a may be at least one of a system controller and a memory controller, for example.

The memory 1b is a storage device that stores various types of data and programs. Each CPU 2 stores and expands data and a program in the memory 1b before executing the program. The memory 1b may be a volatile memory, such as a random access memory (RAM), for example. While FIG. 4 illustrates an example in which the memory 1b is shared by the multiple CPUs 2, this is not limiting and a memory 1b may be provided to each of at least one CPU 2.

The storage unit 1c is hardware that stores various types of data, programs, and the like. The storage unit 1c may be any of various types of devices, such as a magnetic disk device, e.g., a hard disk drive (HDD); a semiconductor drive device, e.g., a solid state drive (SSD); or a non-volatile memory, e.g., a flush memory or an ROM.

The interface unit 1d is a communication interface that controls wired or wireless connections and communications with a network or other information processing apparatuses. The interface unit 1d may be an adaptor that is compliant with the local area network (LAN) standard, the Fibre Channel (FC), the InfiniBand, or the like, for example.

The IO unit 1e includes at least one of various types of devices communicating with the CPUs 2, input devices, and output devices. The input devices may be a mouse, a keyboard, a tough panel, a microphone for voice operations, and the like. The output devices may be a display, a speaker, a printer, and the like.

The above-described blocks 2 and 1a-1e are communicatively connected to each other by buses. The above-described hardware configuration of the information processing apparatus 1 is exemplary, and hardware components in the information processing apparatus 1 may be added or omitted (e.g., addition or omission of any blocks), divided, combined in any of combinations, or buses may be added or omitted, where appropriate.

Next, the CPUs 2 will be described. As exemplified in FIG. 4, each CPU 2 may include a receiving unit 21, a router unit 22, a cache unit 23, and a core unit 24. The receiving unit 21 receives data, e.g., packets (confirms receipts of the packets), which is sent from another CPU 2 or another apparatus (not illustrated) and inputted into the CPU 2, and represents one example of an interface for the CPU 2. Hereinafter, senders of packets, e.g., CPUs 2 or another apparatuses (not illustrated), may be referred to as sources 2 or sources A-D (refer to FIG. 5).

The router unit 22 receives packets which have been confirmed by the receiving unit 21, at input ports (not illustrated), carries out an arbitration (selection), and stores a selected packet in the cache unit 23. The cache unit 23 is a storage device that temporarily stores packets for reducing delays and the like, between the CPU 2 and the bus or the memory 1b, for example. The cache unit 23 may be a fast-speed memory, such as a static RAM (SRAM), for example.

The core unit 24 may perform various types of computations (processes) on packets that are inputted from the router unit 22 via the cache unit 23 (or directly from the router unit 22), and may issue various types of data, e.g., a various computation results, and various commands and the like, e.g., requests and instructions. While a single core unit 24 is provided in the example in FIG. 4, multiple core units 24 may be provided in a single CPU 2. Hereinafter, the core unit 24 (or the cache unit 23) serving as a destination for a packet may be referred to as a target 24.

Figure 5:
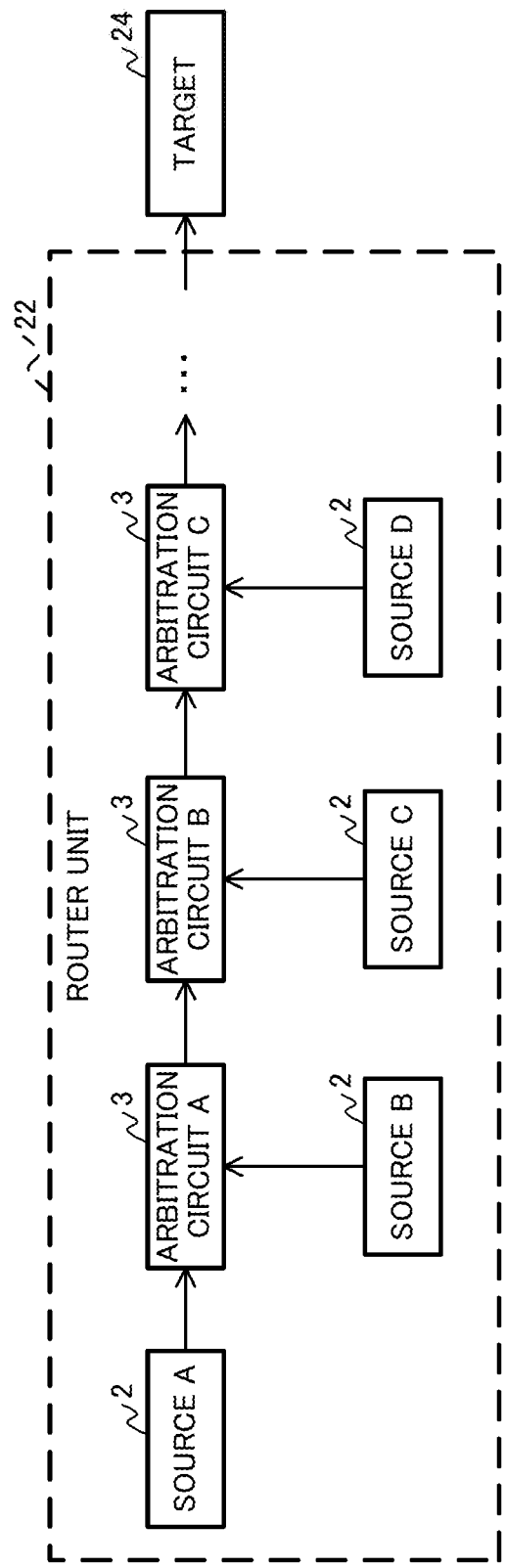
FIG. 5 is a diagram illustrating one example of the router unit depicted in FIG. 4.

As exemplified in FIG. 5, the router unit 22 in the CPU 2 may include multiple arbitration circuits 3 that employ the serial multi-stage arbitration scheme and are connected (coupled) in series, in the similar manner to the arbitration circuit 220B. Hereinafter, the arbitration circuits 3 may be referred to as the arbitration circuits A-C. Among the arbitration circuits 3 connected in series, the arbitration circuits 3 distant from the target 24 (e.g., the arbitration circuit A) are referred to as upstream, whereas the arbitration circuits 3 closer to the target 24 (e.g., the arbitration circuit C) are referred to as downstream. Furthermore, the arbitration circuit 3 that is upstream to a certain arbitration circuit 3 in one stage may be referred to as the previous stage, whereas the arbitration circuit 3 that is downstream to a certain arbitration circuit 3 in one stage may be referred to as the next stage or subsequent stage.

In the router unit 22, the multiple sources 2 (e.g., the sources A-D), such as the CPUs 2, are divided into groups (which correspond to the arbitration circuits A-C), and the winner (the source A or B) in the group of the arbitration circuit A, for example, is then made to participate in an arbitration of the group (the source C) of the arbitration circuit B in the next stage. A packet from the winner of the arbitration in the arbitration circuit C is thus transmitted to the target 24.

Since it is possible to reduce the number of sources 2 in an arbitration little by little in each stage, the load on each arbitration circuit 3 in the router unit 22 is reduced, as compared to the load on the arbitration circuit 220A depicted in FIG. 1. Hence, the design of the arbitration circuits 3 can be made easier. Since a packet is transferred on the reduced number of buses that participate in an arbitration, the size reduction of the circuit can also be achieved.

Hereinafter, one example of operations of the information processing apparatus 1 in accordance with one embodiment will be described.

Firstly, as a comparative example, exemplary operations of the arbitration circuits 220B (the arbitration circuits A and B) in the information processing apparatus 100 including the multiple CPU 200 provided with the multiple arbitration circuits 220B depicted in FIG. 2, will be described.

As depicted in FIG. 6A, the arbitration circuit A that is the first-stage arbitration circuit 220B arbitrates between a packet A from the source A and a packet B from the source B, and transmits the packet A and the packet B to the arbitration circuit B, in this order, for example.

As depicted in FIG. 6B, the arbitration circuit B that is the second-stage arbitration circuit 220B arbitrates between the packet A from the arbitration circuit A and a packet C0 from the source C, and transmits the packet A and the packet C0 to the arbitration circuit C, in this order, for example. The arbitration circuit B then arbitrates between the packet B from the arbitration circuit A and the packet C1 from the source C, and transmits the packet B and the packet C1 to the arbitration circuit C, in this order, following the packet C0 that has been transmitted previously, for example.

The timing chart of arbitrations by the router unit 220 provided with the above-described arbitration circuit 220B (the arbitration circuit B, in this case) is exemplified in FIG. 8A. Note that the vertical axis represents time in FIG. 8A. A single frame on the vertical axis indicates one arbitration cycle, for example, one clock. Hereinafter, packets "A0" to "C4" from the sources A-C may also be denoted simply as "A0" to "C4".

As depicted in FIG. 8A, outputs from the arbitration circuit B to the target (the arbitration circuit C) are "A0", "C0", "B0", "C1", . . . , and the ratios of selections of the sources A-C (the bus usage ratios) are (A:B:C=1:1:2). As evident from the time duration during which the sources A-C transmit packets in FIG. 8A, the source C is selected at a frequency twice the frequencies of the sources A and B, and hence it is understood that the bus usage ratios are not equalized among the sources. Note that the LRU scheme is one example of arbitration scheme employed by the arbitration circuits 220B, and a value of "0" indicates that one input port is to be selected whereas a value of "1" indicates that another input port is to be selected.

In contrast, in the information processing apparatus 1 in accordance with one embodiment, the arbitration circuits 3 (the arbitration circuits A and B) exemplified in FIG. 5 may include the following configurations.

In the information processing apparatus 1 in accordance with one embodiment, a CPU 2 (e.g., the receiving unit 21 or the router unit 22) that is a source (sender) of a packet can add an identifier of the sender, e.g., the source identification (ID) of that CPU 2, to the packet which is about to be sent by the CPU 2.

The source ID is an ID that is unique to each of the sources 2 provided in the information processing apparatus 1. At least a part of the identifier unique to each CPU 2 or another apparatus, such as the serial number, or information for sending packets, such as a sequence number that has been provided to each source 2 in advance, may be used as the source ID, for example. Any other information that can be used to identify a particular source 2 may be used as the source ID.

As described above, source IDs attached to packets inputted to the arbitration circuits 3 can be regarded as the identifiers for identifying the respective sources 2.

Note that the source ID may be attached to any position of a packet, such as the leading or tail parts, or may be included (embedded) in a packet such that the contents of the packet are not changed. The source ID may be transmitted on a bus separate from the bus for packets. Herein, source IDs are attached to the tail of packets, for the sake of description.

Further, in the information processing apparatus 1 in accordance with one embodiment, each arbitration circuit 3 may include an LRU register that stores history for win/lose of each arbitration between sources 2, in place of the LRU (LRU register) provided in the above-described arbitration circuit 220B.

The LRU register may store a 1-bit flag of a history for win/lose in an arbitration of each source 2, for each combination of all of the sources 2 of packets inputted to this arbitration circuit 3. For example, an LRU register for an arbitration circuit 3 stores a flag, for sources 2 connected to: the upstream arbitration circuit 3; and this arbitration circuit 3, for each combination of the sources 2 to which a contention of packets may occur in this arbitration circuit 3. Hereinafter, the flags stored in the LRU register may be referred to as LRU status flags.

As one example, in the arbitration circuit A that is the first-stage arbitration circuit 3 depicted in FIG. 7A, two sources 2 (the sources A and B) merge at the arbitration circuit A. Accordingly, the LRU register for the arbitration circuit A has the LRU status flag for the combination of the sources A and B, as depicted in FIG. 7A.

In the arbitration circuit B that is the second-stage arbitration circuit 3 depicted in FIG. 7B, two sources 2 (the sources A and B) merge at the upstream arbitration circuit A, and one source 2 (the source C) merges at the arbitration circuit B. Accordingly, the LRU register for the arbitration circuit B has the LRU status flag for the combination of the sources A and C, and the LRU status flag for the combination of the sources B and C, as depicted in FIG. 7B. These LRU status flags are identified in bit positions in the LRU register. For example, the $0^{th}$-bit is the LRU status flag for the combination of the sources A and C, and the $1^{st}$-bit is the LRU status flag for the combination of the sources B and C.

It is noted that the LRU register for the arbitration circuit B does not have the LRU status flag for the combination of the sources A and B. This is because the packet A from the source A and the packet B from the source B are arbitrated in the upstream arbitration circuit A and hence one of these packets is transmitted to the arbitration circuit B one by one. That is, no contention occurs between the packet A and the packet B in the arbitration circuit B.

When multiple packets are inputted (a contention of packets occurs), the arbitration circuits 3 can select one packet using above-described source IDs and the LRU register in the technique exemplified in the following (i)-(iv), and transmit the selected packet to the subsequent stage or the target 24:

(i) Based on the source ID attached to each of the inputted packets, the sources 2 of the packets are identified.

(ii) Based on the values of the LRU status flags at the bit positions corresponding to combinations of the identified multiple sources 2 among the LRU status flags in the LRU register, and a selection logic that has been set in advance in each arbitration circuit 3, a source 2 that is to be selected preferentially, is determined.

(iii) The packet from the source 2 determined as preferential is selected, and the selected packet is transmitted to the subsequent stage or the target 24.

(iv) The LRU status flag is updated such that the source 2 of the selected packet has a priority lower than the priorities of the other sources 2.

As described above, in the CPU 2 in accordance with one embodiment, since the arbitration circuits 3 carry out an arbitration based on the source IDs attached to transferred (received) packets and the LRU register, the bus usage ratios can be equalized among all of the sources 2 that may input to the arbitration circuits 3.

Note that any of the above processes (iii) and (iv) may be carried out prior to the other processes, or the processes (iii) and (iv) may be carried out in parallel.

Hereinafter, operations of the arbitration circuits 3 (the arbitration circuits A and B) exemplified in FIG. 5 in the information processing apparatus 1 in accordance with one embodiment will be described, together with a brief summary of the selection logic.

The selection logic for sources 2 in the arbitration circuit A is depicted in FIG. 7A, for example. In an example of the selection logic in FIG. 7A, the "bit" column represents the bit position in the LRU status flag. The "obtain priority upon b0" column indicates the source 2 that has a priority when the value of the bit is "0" but does not have a priority when the value of the bit is "1". The "obtain priority upon b1" column indicates the source 2 that has a priority when the value of the bit is "1" but does not have a priority when the value of the bit is "0". In the selection logic exemplified in FIG. 7A, the source A has a priority when the value of the $0^{th}$-bit of the LRU status flag is "0", whereas the source B has a priority when that value is "1".

In the following description, numbers with the precedent letter "b", such as "b0" and "b1", indicate binary values (bit arrays), and "b01" represents a 2-bit bit array having the $0^{th}$-bit value of "1" and the $1^{st}$-bit value of "0", for example.

Here, an example will be discussed in which a packet A and a packet B are inputted to the arbitration circuit A when the value of the LRU status flag takes its initial value, e.g., "b0" indicating that the source A has a priority, in FIG. 7A.

In this case, the arbitration circuit A determines that the sources 2 of the packets are the sources A and B, from the source IDs attached to the packet A and the packet B (the above-described process (i)). From the identified sources A and B, the arbitration circuit A selects the source A specified in the "obtain priority upon b0" part, based on the value "b0" of the LRU status flag and the selection logic (the above-described process (ii)).

The arbitration circuit A then transmits the packet A from the selected source A to the arbitration circuit B (the above-described process (iii)). Since the source A was selected, the arbitration circuit A inverses the value of the LRU status flag associated with the source A (changes it to "b1" in this case) to update the LRU status flag (the above-described process (iv)). This ensures that the source B specified in the "obtain priority upon b1" part is to be selected when packets are inputted from the sources A and B next time. Hereinafter, the relationship among priorities of the sources 2 based on the LRU status flags may be expressed using inequalities, such as B>A. The expression "B>A" (the value in the LRU register="b1", in the example in FIG. 7A) means that the source B has a priority higher than that of the source A, and hence the source B is to be selected by the arbitration circuit 3.

Note that the arbitration circuit A selects the packet B in the subsequent arbitration, and transmits the selected packet B to the arbitration circuit B, subsequent to the packet A. Since the source B was selected, the arbitration circuit A inverses the value of the LRU status flag to update it to "b0".

Here, an LRU status flag associated with a source 2 may be an LRU status flag indicating that that source 2 has a priority, among LRU status flags for which that source 2 is related to the "obtain priority upon b0" or "obtain priority upon b1".

The arbitration circuit B that is the second-stage arbitration circuit 3 has a selection logic for sources 2 as depicted in FIG. 7B, for example. In the example in FIG. 7B, the source A has a priority when the value of the $0^{th}$-bit of the LRU status flag is "0", whereas the source C has a priority when that value is "1". The source B has a priority when the value of the $1^{st}$-bit of the LRU status flag is "0", whereas the source C has a priority when that value is "1".

An example will be discussed in which a packet A and a packet C are inputted to the arbitration circuit B when the value of the LRU status flag takes its initial value in FIG. 7B. Note that the initial value of the LRU status flag is "b00" indicating that the source A has a priority for the combination of the sources A and C and that the source B has a priority for the combination of the sources B and C.

In this case, the arbitration circuit B determines that the sources 2 of the packets are the sources A and C, from the source IDs attached to the packet A and the packet C (the above-described process (i)). The arbitration circuit B selects the source A specified in the "obtain priority upon b0" part, based on the value "0" of the $0^{th}$-bit of the LRU status flag in the value "b00" of the LRU register, which indicates the combination of the identified sources A and C, and the selection logic (the above-described process (ii)).

The arbitration circuit B then transmits the packet A from the selected source A to the arbitration circuit C (the above-described process (iii)). Since the source A was selected, the arbitration circuit B inverses the value of the $0^{th}$-bit of the LRU status flag associated with the source A (changes the value of the LRU register to "b01" in this case) to update the LRU status flag (the above-described process (iv)). This ensures that the source C specified in the "obtain priority upon b1" part is to be selected since the value of the $0^{th}$-bit of the LRU status flag is "1", when packets are inputted from the sources A and C next time.

Further, in the example in FIG. 7B, in the subsequent arbitration, the packet B from the source B and the packet C from the source C (that was not selected in the previous arbitration) are inputted to the arbitration circuit B. In this case, the arbitration circuit B selects the source B specified in the "obtain priority upon b0" part, based on the value "0" of the $1^{st}$-bit of the LRU status flag in the value "b01" of the LRU register, which indicates the combination of the identified sources B and C, and the selection logic. The arbitration circuit B then transmits the packet B from the selected source B to the arbitration circuit C.

In this case, since the source B was selected, the arbitration circuit B inverses the value of the $1^{st}$-bit of the LRU status flag associated with the source B (changes the value of the LRU register to "b11" in this case) to update the LRU status flag. This ensures that the source C specified in the "obtain priority upon b1" part is to be selected since the value of the $1^{st}$-bit of the LRU status flag is "1", when packets are inputted from the sources B and C next time.

In the example in FIG. 7B, a packet C from the source C is inputted to the arbitration circuit B in the subsequent arbitration. In this case, since there is no merging packet other than the packet C, the arbitration circuit B transmits the packet C to the arbitration circuit C, subsequent to the packet B.

If a packet A from the source A is inputted to the arbitration circuit B in addition to the packet C from the source C, the arbitration circuit B selects the source C. This is because the value of the $0^{th}$-bit of the LRU status flag in the value "b11" of the LRU register, which indicates the combination of the sources A and C, is "1", and the source 2 specified in the "obtain priority upon b1" part is the source C.

When the arbitration circuit B selects the source C, the arbitration circuit B inverses the values of the $0^{th}$- and the $1^{st}$-bits of the LRU status flag associated with the source C, to update the LRU status flag. In this case, the value in the LRU register is updated to "b00" (initial value). This ensures that the source A or the source B specified in the "obtain priority upon b0" part is to be selected since the values of the $0^{th}$- and $1^{st}$-bits of the LRU status flag are both "0", when packets are inputted from the sources A and C or the sources B and C next time.

The timing chart of arbitrations by the above-described router unit 22 (arbitration circuits 3) is exemplified in FIG. 8B. As depicted in FIG. 8B, outputs from the arbitration circuit B to the target (the arbitration circuit C) are "A0", "B0", "C0", "A1", . . . . Accordingly, the ratios of selections of the sources A-C (the bus usage ratios) are ((A+B):C=2:1), on other words, (A:B:C=1:1:1), and the ratios are thus equalized.

As described above, the arbitration circuit B can carry out arbitrations in an equalized manner among all of the sources 2 in which a contention of packets, such as "A0", "B0", "C0", "A1", "B1", and "C1", may occur in the arbitration circuits based on the priorities that are set as the selection logic. Accordingly, the bus usage ratios for packets can be equalized among the three sources A-C. Note that the initial values of the LRU status flags and the selection logics depicted in FIGS. 7A and 7B are merely exemplary, and the bus usage ratios of the three sources A-C are equalized even when the setting indicates that the source C has a priority to the sources A and B in the initial state.

Further, in accordance with the information processing apparatus 1, the above-described operations can be achieved by addition of a function (e.g., a process) for adding source IDs to sending packets or modification of a function (e.g., a circuit) related to the LRU register and the selection logic, in the CPUs 200 provided with the arbitration circuits 220B. Accordingly, an increase in the circuit size can be suppressed.

(2-2) Exemplary Configuration of Router Unit

Next, an exemplary configuration of the router unit 22 in accordance with one embodiment will be described. Here, it is assumed that the router unit 22 includes arbitration circuits (selection circuits) 3 in three stages (arbitration circuits A-C) which are connected in series, and that the arbitration circuit C is connected to the target 24, as exemplified in FIG. 9.

It is also assumed that packets are inputted from the sources A-C to the arbitration circuit A, from the arbitration circuit A and the sources D and E to the arbitration circuit B, and the arbitration circuit B and the sources F and G to the arbitration circuit C. As described above, in the example in FIG. 9, arbitrations are carried out among the seven sources 2 in each arbitration circuit 3, at ratios of 3:1 (in the arbitration circuit A), 3:1 (in the arbitration circuit B), and 3:1 (in the arbitration circuit C), and the selected packet is transmitted to one bus to the target 24. Note that packets outputted from the arbitration circuits A-C are temporarily stored in the respective buffers in the arbitration circuits 3.

Figure 10:
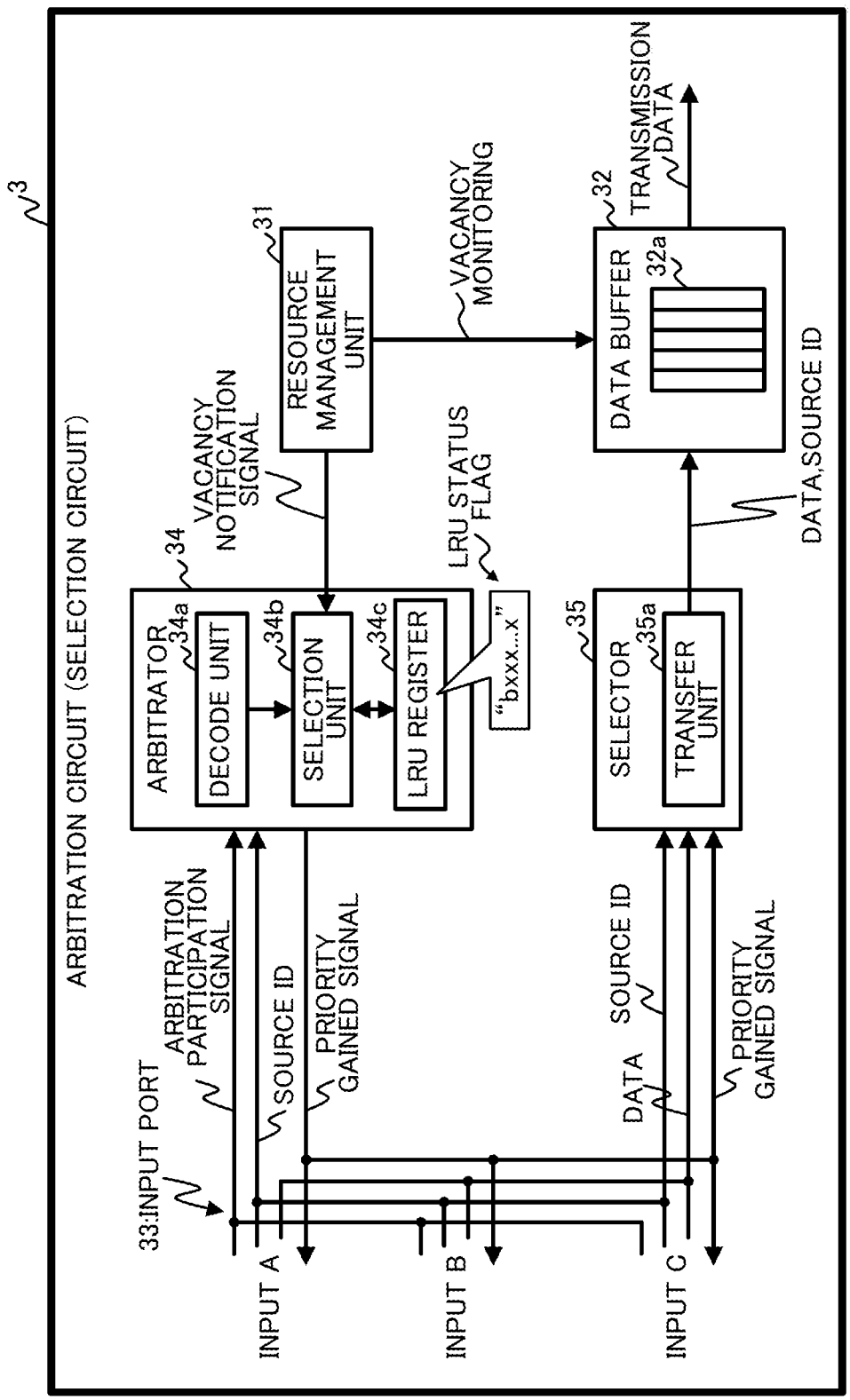
FIG. 10 is a diagram illustrating an exemplary configuration of the arbitration circuit depicted in FIG. 9.

As depicted in FIG. 10, each arbitration circuit 3 may include a resource management unit 31, a data buffer 32, multiple (three in the example in FIG. 10) input ports 33, an arbitrator 34, and a selector 35, for example.

The resource management unit 31 monitors the resource of the data buffer 32, and outputs a vacancy notification signal to the arbitrator 34 while a storage area (vacancy) is available for storing a packet. If there is no free storage area in the data buffer 32, the resource management unit 31 notifies the arbitrator 34 of the absence of a vacancy such that the arbitrator 34 does not transmit a priority gained signal, thereby stopping data transfer by the selector 35. Thereby, the resource management unit 31 can notify the arbitrator 34 whether or not data can be transferred or not (ON or OFF of data transfer). Note that the notification of the vacancy notification signal and the notification for stopping transmission of the priority gained signal may be embodied with a control (switching) between the H (High) level and the L (Low) level on a common signal line.

The data buffer 32 may include a buffer 32a that temporarily stores a packet that is selected and transferred by the selector 35. In response to a packet being stored in the buffer 32a, the data buffer 32 notifies the transfer destination (the arbitration circuit 3 in the subsequent stage or the target 24) of an arbitration participation signal. The data buffer 32, in response to receiving a priority gained signal from the transfer destination, transmits a packet stored in the buffer 32a, to the transfer destination. The buffer 32a may be a first-in-first-out (FIFO) register or the like, for example.

The input ports 33 are connected to the receiving unit 21 or the arbitration circuit 3 in the previous stage, and are input terminals to which information, such as a packet transmitted from the source 2 or a packet arbitrated and transmitted in the arbitration circuit 3 in the previous stage, is inputted. In the example in FIG. 10, the sections (input units) from which signal lines (buses) connected to the "input A" through "input C" branch out are denoted as the input ports 33.

The information inputted to the input port 33 includes data (e.g., a packet), an identifier (e.g., a source ID) of a source 2 of the data, and an arbitration participation signal, for example. Note that a packet has a source ID attached thereto, for example. The information inputted to the input ports 33 is outputted to at least one of the arbitrator 34 and the selector 35, depending on the type of the information. While the bus for data and the bus for source IDs are depicted as separate buses in the example in FIG. 10 for the sake of the brevity, this is not limiting. For example, the buses may be integrated, and data and source IDs may be transmitted on a single bus.

Further, the input port 33 can output a priority gained signal outputted from the arbitrator 34, to the receiving unit 21 or the arbitration circuit 3 in the previous stage, and to the selector 35.

The arbitrator 34 is adapted to arbitrate among multiple input packets to select one packet (one input port 33), and may include a decode unit 34a, a selection unit 34b, and an LRU register 34c, for example.

The decode unit 34a interprets the source ID for an arbitration participation signal inputted from the input port 33 and a source ID, and outputs information about the source 2 of the packet to the selection unit 34b, together with the arbitration participation signal.

The information about the source 2 of the packet outputted to the selection unit 34b may be the source ID of the source 2, or may be any of other identifiers that can be used to identify the source 2 in the selection unit 34b. Here, it is assumed that the decode unit 34a outputs source IDs to the selection unit 34b, for the sake of description. In an alternative configuration in which data and a source ID are inputted through a single bus, the decode unit 34a may carry out a process to extract a source ID from information that is inputted.

Note that the above-described decode unit 34a may output an arbitration participation signal and a source ID to the selection unit 34b, while a vacancy notification signal is being notified from the resource management unit 31, while a notification for stopping a transmission of a priority gained signal is not sent, or the like.

The LRU register 34c represents one example of a register that stores priority information of the input ports 33, which is referenced to and updated by the selection unit 34b. The LRU register 34c may be similar to the LRU register exemplified in FIG. 7A and FIG. 7B.

The LRU register 34c may retain LRU status flags as described above. The number of bits of the LRU status flag varies depending on where this arbitration circuit 3 is located relative to the most upstream stage.

Figure 11:
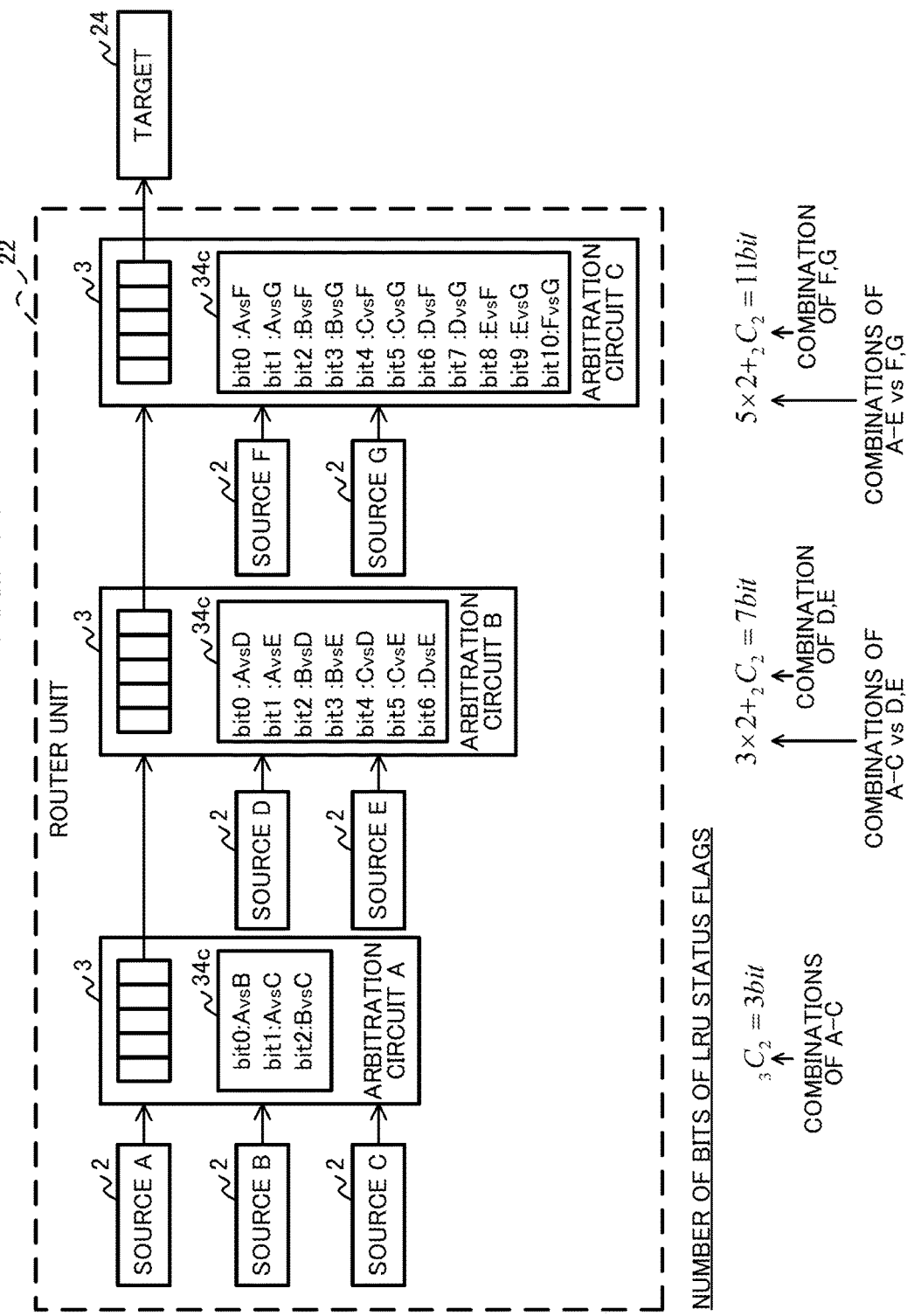
FIG. 11 is a diagram illustrating one example of LRU registers in the arbitration circuits A-C in the router unit depicted in FIG. 9.

For example, as depicted in FIG. 11, the first-stage arbitration circuit A has an LRU status flag in three bits for retaining the arbitration history of the sources A-C participating in an arbitration in the arbitration circuit A, as calculated from the combination of the three sources A-C, as follows:

$_3C_2=3$ bits (refer to FIG. 12A)

As depicted in FIG. 11, the second-stage arbitration circuit B retains the arbitration history of the sources D and E participating in an arbitration in the arbitration circuit B, against the sources A-C participating in the arbitration in the previous-stage arbitration circuit A, and the arbitration history of the sources D and E. As set forth above, there is no need for the arbitration circuit B to consider the combination of the sources A-C participating in the arbitration in the previous-stage arbitration circuit A. Hence, the arbitration circuit B has an LRU status flag in seven bits in total, for the combination of the two sources D and E in the arbitration circuit B against the three sources A-C at the previous stage, and for the combination of the two sources D and E in the arbitration circuit B, as follows:

$3\times2+_2C_2=7$ bits (refer to FIG. 12B)

As depicted in FIG. 11, the third-stage arbitration circuit C retains the arbitration history of the sources F and G participating in an arbitration in the arbitration circuit C, against the sources A-E participating in the arbitrations in the upstream arbitration circuits A and B, and the arbitration history of the sources F and G. Hence, the arbitration circuit C has an LRU status flag in eleven (11) bits in total, for the combination of the two sources F and G in the arbitration circuit C against the five sources A-E at the previous stages, and for the combination of the two sources F and G in the arbitration circuit C, as follows:

$5\times2+_2C_2=11$ bits (refer to FIG. 12C)

As described above, the number of LRU status flags retained in the LRU register 34c is determined by the number of sources 2 merging at the upstream arbitration circuit(s) 3 and the number of sources 2 merging at this arbitration circuit 3. In other words, it can be regarded that the LRU register 34c in each arbitration circuit 3 stores priority information representing priorities for all of sources 2 of packets, among which this arbitration circuit 3 carries out arbitrations.

Stated differently, it can be regarded that the LRU register 34c in each arbitration circuit 3 stores priority information indicating respective priorities for a plurality of sources 2 connected to: the arbitration circuit 3 upstream to this arbitration circuit 3; and this arbitration circuit 3. Here, the priority information includes indications indicating a source 2 selected by the selection unit 34b, for each of one or more combinations of a plurality of sources 2, including the sources 2 connected to the upstream arbitration circuit 3, and the sources 2 connected to this arbitration circuit 3. The one or more combinations include combinations of one source 2 connected to the upstream arbitration circuit 3 and one or more sources 2 connected to this arbitration circuit 3, and combinations of two or more sources 2 connected to this arbitration circuit 3.

The selection unit 34b selects one input port 33, from one or more input ports 33 to which a packet is inputted among the multiple input ports 33, and gives a priority to the selected input port 33.

For example, the selection unit 34b can compare one or more source IDs inputted from the decode unit 34a against an LRU status flag in the LRU register 34c, and select one source ID based on the selection logic. The selection unit 34b can then output a priority gained signal indicating the input port 33 corresponding to the selected source ID, to that input port 33 and the selector 35. Since the selection unit 34b receives the arbitration participation signal from the decode unit 34a together with the source ID, the selection unit 34b can identify the input port 33 corresponding to the selected source ID, based on the arbitration participation signal inputted from the decode unit 34a.

After outputting the priority gained signal, the selection unit 34b can also update the LRU register 34c such that the priority information of the source 2 for the selected source ID has a lower (e.g., the lowest) priority than those in the priority information of the other sources 2.

The techniques for the selection of source IDs and update of the LRU register 34c by the selection unit 34b are basically similar to those described above with reference to FIG. 7A and FIG. 7B. For example, the selection unit 34b selects one source 2, based on the value of an LRU status flag at the bit position indicating the combination of sources 2 inputted from the decode unit 34a, in the value in the LRU register, and the selection logic. FIG. 12A-FIG. 12C illustrate an example of a selection logic for the sources 2 in each arbitration circuit 3 in the configuration of the router unit 22 depicted in FIG. 9.

As an example, it is assumed that packets are inputted to the arbitration circuit A from three sources 2, i.e., the sources A-C. In this case, the sources 2 have the respective priorities as exemplified in FIG. 12A, and the selection unit 34b in the arbitration circuit A selects the source A from the three sources 2, based on this selection logic. A wide variety of techniques may be utilized for the selection, depending on the circuit design of the arbitration circuits 3.

For example, the selection unit 34b may select one arbitrary source ID, and determine whether any source ID having a higher priority than that for the selected source ID is inputted from the decode unit 34a. In this case, if the priority of that source ID is the highest, the selection unit 34b may select the selected source ID. Otherwise, if a source ID having a higher (the highest) priority than that for the selected source ID is inputted from the decode unit 34a, the selection unit 34b may select the source ID having the higher (the highest) priority. Here, it is assumed that the selection unit 34b selects a source 2 using the technique as described above.

Alternatively, the selection unit 34b may determine whether or not a source ID is inputted from the decode unit 34a for every source ID specified in the selection logic, from a source ID having the highest priority, in the descending order of the priority. If the selection unit 34b finds a source ID that is inputted from the decode unit 34a for the first time, the selection unit 34b may select that source ID. Or, the selection unit 34b may utilize any of a wide variety of techniques, depending on the circuit design of the selection unit 34b provided with the selection logic.

The selection unit 34b then outputs a priority gained signal corresponding to the selected source 2 to the input port 33 and the selector 35, and inverses the value of the LRU status flag at the bit position associated with the selected source 2 to update the LRU status flag.

Note that a notification of a vacancy notification signal from the resource management unit 31 and a notification for stopping a transmission of a priority gained signal may be inputted to the selection unit 34b, instead of the decode unit 34a. In this configuration, a selection of a source ID and an output of a priority gained signal by the above-described selection unit 34b may be carried out while a vacancy notification signal is being inputted from the resource management unit 31, while a notification for stopping a transmission of a priority gained signal is not sent, or the like.

As described above, it can be regarded that the selection unit 34b represents one example of a selection unit that selects a first input port 33 from two or more input ports 33 each receiving data and an identifier (identification information), based on the two or more identifiers and the LRU register 34c (LRU status flag). The selection unit 34b selects the first source 2 from one or more combinations of two or more sources 2 indicated by the two or more identifiers, based on one or more LRU status flags corresponding to the one or more combinations in the LRU register 34c. The selection unit 34b then selects the first input port 33, to which data is inputted from the selected first source 2.

Furthermore, it can be regarded that the selection unit 34b represents one example of an update unit that updates a priority for the first source 2 indicated by the first identifier being received by the first input port 33, in the LRU status flags. The selection unit 34b, as serving as such an update unit, updates the one or more LRU status flags corresponding to the first source 2 in the LRU register 34c such that a source 2 different from the first source 2 is to be selected among the combinations indicated by the flags.

The selector 35 is adapted to transfer the first data and source ID that are inputted from the first input port 33 selected by the selection unit 34b, to a transfer destination, and may include a transfer unit 35a. For example, the transfer unit 35a can transmit a packet, e.g., data and the source ID, from the input port 33 specified in a priority gained signal outputted from the selection unit 34b, to the data buffer 32.

The transfer unit 35a can notify the arbitration circuit 3 in the subsequent stage, of the packet that has the source ID attached by the source 2 of the packet, without carrying out any processes on the packet, as described above. Accordingly, since the arbitration circuit 3 does not have to process a packet, such as a process for addition or update of information indicating the priority in the packet, an increase in the circuit size can be suppressed and a delay related to transfer of the packet can be reduced. Source IDs attached to packets may be any information that can be used to identify sources 2, and may be information as small as several bits, for example. Accordingly, even when packets having source IDs attached thereto, are transmitted over a bus, an increase in the bandwidth consumption (usage ratio) in the router unit 22 is in a negligible level.

As described above, it can be regarded that the transfer unit 35a represents one example of a transfer unit that transfers the data and the first identifier passed through the first input port 33, to a transfer destination, i.e., the arbitration circuit 3 in the subsequent stage or the target 24.

The timing chart of arbitrations by the above-described router unit 22 (the arbitration circuit 3) (refer to FIG. 9) is exemplified in FIGS. 13 to 15. Here, it is assumed that the same selection logic depicted in FIG. 12 is used as the selection logic for sources 2 in the arbitration circuits A-C, and the values in the respective LRU registers 34c in the arbitration circuits A-C are all set to their initial values, e.g., all of the LRU status flags are set to "0", for example. Further, FIGS. 13 to 15 indicate information from each of sources 2 and the arbitration circuit 3 in the previous stage, the values in the LRU register 34c, and information outputted from the transmission bus to the arbitration circuit 3 in the next stage or the target 24, at Cycles 1 to 8. Each cycle is defined by an operation clock of the router unit 22, for example. Each of the sources A-G outputs a packet at every cycle.

In the arbitration circuit A, as depicted in FIG. 13, an arbitration is carried out among packets inputted from the sources A-C using the simple LRU scheme, and the packets are transmitted from the arbitration circuit A, in the order of "A0", "B0", "C0", . . . , in an equalized manner among the sources 2.

For example, in the arbitration circuit A, at Cycle 1, "A0", "B0", and "C0" participate in an arbitration. The LRU status flag for the arbitration circuit A is "b000", and thus the priorities are A>B>C (refer to FIG. 12A). Accordingly, the arbitration circuit A selects the source A and outputs "A0", and the $0^{th}$ and $1^{st}$ bits associated with the source A in the LRU status flags are inversed ("1" is set to each bit).

Then, at Cycle 2, "A1", "B0", and "C0" participate in an arbitration. The LRU status flag for the arbitration circuit A is "b011", and thus the priorities are B>C>A. Accordingly, the arbitration circuit A selects the source B and outputs "B0", and the $0^{th}$ and $2^{nd}$ bits associated with the source B in the LRU status flags are inversed ("0" and "1" are set, respectively).

Then, at Cycle 3, "A1", "B1", and "C0" participate in an arbitration. The LRU status flag for the arbitration circuit A is "b110", and thus the priorities are C>A>B. Accordingly, the arbitration circuit A selects the source C and outputs "C0", and the $1^{st}$ and $2^{nd}$ bits associated with the source C in the LRU status flags are inversed ("0" is set to each bit).

Since processes similar to those in the arbitration circuit A are carried out after Cycle 4, packets are transferred at a ratio of Source A:Source B:Source C=1:1:1.

As depicted in FIG. 14, in the arbitration circuit B, for the arbitration result arbitrated in the arbitration circuit A at a ratio of 1:1:1, packets from the sources D and E are merged such that the following ratio is achieved: Output from arbitration circuit A:Source D:Source E=3:1:1.

For example, in the arbitration circuit B, at Cycle 1, "D0" and "E0" participate in an arbitration. The LRU status flag for the arbitration circuit B is "b0000000", and thus the priorities are A>B>C>D>E (refer to FIG. 12B). Accordingly, the arbitration circuit B selects the source D and outputs "D0", and the $6^{th}$-bit associated with the source D in the LRU status flags is inversed ("1" is set).

Then, at Cycle 2, "A0", "D1", and "E0" participate in an arbitration. The LRU status flag for the arbitration circuit B is "b1000000", and thus the priorities are A>B>C>E>D. Accordingly, the arbitration circuit B selects the source A and outputs "A0", and the $0^{th}$ and $1^{st}$ bits associated with the source A in the LRU status flags are inversed ("1" is set to each bit).

Then, at Cycle 3, "B0", "D1", and "E0" participate in an arbitration. The LRU status flag for the arbitration circuit B is "b1000011", and thus the priorities are B>C>E>D>A. Accordingly, the arbitration circuit B selects the source B and outputs "B0", and the $2^{nd}$ and $3^{rd}$ bits associated with the source B in the LRU status flags are inversed ("1" is set to each bit).

Then, at Cycle 4, "C0", "D1", and "E0" participate in an arbitration. The LRU status flag for the arbitration circuit B is "b1001111", and thus the priorities are C>E>D>A>B. Accordingly, the arbitration circuit B selects the source C and outputs "C0", and the $4^{th}$ and $5^{th}$ bits associated with the source C in the LRU status flags are inversed ("1" is set to each bit).

Then, at Cycle 5, "A1", "D1", and "E0" participate in an arbitration. The LRU status flag for the arbitration circuit B is "b1111111", and thus the priorities are E>D>A>B>C. Accordingly, the arbitration circuit B selects the source E and outputs "E0", and the $1^{st}$, $3^{rd}$, $5^{th}$, and $6^{th}$ bits associated with the source E in the LRU status flags are inversed ("0" is set to each bit).

Then, at Cycle 6, "A1", "D1", and "E1" participate in an arbitration. The LRU status flag for the arbitration circuit B is "b0010101", and thus the priorities are D>A>B>C>E. Accordingly, the arbitration circuit B selects the source D and outputs "D1", and the $0^{th}$, $2^{nd}$, $4^{th}$, and $6^{th}$ bits associated with the source D in the LRU status flags are inversed ("0" is set to $0^{th}$, $2^{nd}$, and $4^{th}$ bits, and "1" is set to the $6^{th}$-bit).

Since processes similar to those in the arbitration circuit B are carried out after Cycle 7, packets are transferred at a ratio of: Output from arbitration circuit A:Source D:Source E=3:1:1.

As depicted in FIG. 15, in the arbitration circuit C, for the arbitration result in the arbitration circuit B at a ratio of 3:1:1, packets from the sources F and G are merged such that the following ratio is achieved: Output from arbitration circuit B:Source F:Source G=5:1:1.

For example, in the arbitration circuit C, at Cycle 1 "F0" and "G0" participate in an arbitration. The LRU status flag for the arbitration circuit C is "b00000000000", and thus the priorities are A>B>C>D>E>F>G (refer to FIG. 12C). Accordingly, the arbitration circuit C selects the source F and outputs "F0", and the $10^{th}$-bit associated with the source F in the LRU status flags is inversed ("1" is set).

Then, at Cycle 2, "D0", "F1", and "G0" participate in an arbitration. The LRU status flag for the arbitration circuit C is "b10000000000", and thus the priorities are A>B>C>D>E>G>F. Accordingly, the arbitration circuit C selects the source D and outputs "D0", and the $6^{th}$ and $7^{th}$ bits associated with the source D in the LRU status flags are inversed ("1" is set to each bit).

Then, at Cycle 3, "A0", "F1", and "G0" participate in an arbitration. The LRU status flag for the arbitration circuit C is "b10011000000", and thus the priorities are A>B>C>E>G>F>D. Accordingly, the arbitration circuit C selects the source A and outputs "A0", and the $0^{th}$ and $1^{st}$ bits associated with the source A in the LRU status flags are inversed ("1" is set to each bit).

Then, at Cycle 4, "B0", "F1", and "G0" participate in an arbitration. The LRU status flag for the arbitration circuit C is "b10011000011", and thus the priorities are B>C>E>G>F>D>A. Accordingly, the arbitration circuit C selects the source B and outputs "B0", and the $2^{nd}$ and $3^{rd}$ bits associated with the source B in the LRU status flags are inversed ("1" is set to each bit).

Then, at Cycle 5, "C0", "F1", and "G0" participate in an arbitration. The LRU status flag for the arbitration circuit C is "b10011001111", and thus the priorities are C>E>G>F>D>A>B. Accordingly, the arbitration circuit C selects the source C and outputs "C0", and the $4^{th}$ and $5^{th}$ bits associated with the source C in the LRU status flags are inversed ("1" is set to each bit).

Then, at Cycle 6, "E0", "F1", and "G0" participate in an arbitration. The LRU status flag for the arbitration circuit C is "b10011111111", and thus the priorities are E>G>F>D>A>B>C. Accordingly, the arbitration circuit C selects the source E and outputs "E0", and the $8^{th}$ and $9^{th}$ bits associated with the source E in the LRU status flags are inversed ("1" is set to each bit).

Then, at Cycle 7, "D1", "F1", and "G0" participate in an arbitration. The LRU status flag for the arbitration circuit C is "b11111111111", and thus the priorities are G>F>D>A>B>C>E. Accordingly, the arbitration circuit C selects the source G and outputs "G0", and the $1^{st}$, $3^{rd}$, $5^{th}$, $7^{th}$, $9^{th}$, and $10^{th}$ bits associated with the source G in the LRU status flags are inversed ("0" is set to each bit).

Since processes similar to those in the arbitration circuit C are carried out after Cycle 8, packets are transferred at a ratio of: Output from arbitration circuit B:Source F:Source G=5:1:1.

After the operations as described above, "F0", "D0", "A0", "B0", "C0", "E0", "G0", . . . , are transmitted to the target 24 from the output of the arbitration circuit C (the transmission bus for the arbitration circuit C), in this order.

Figure 9:
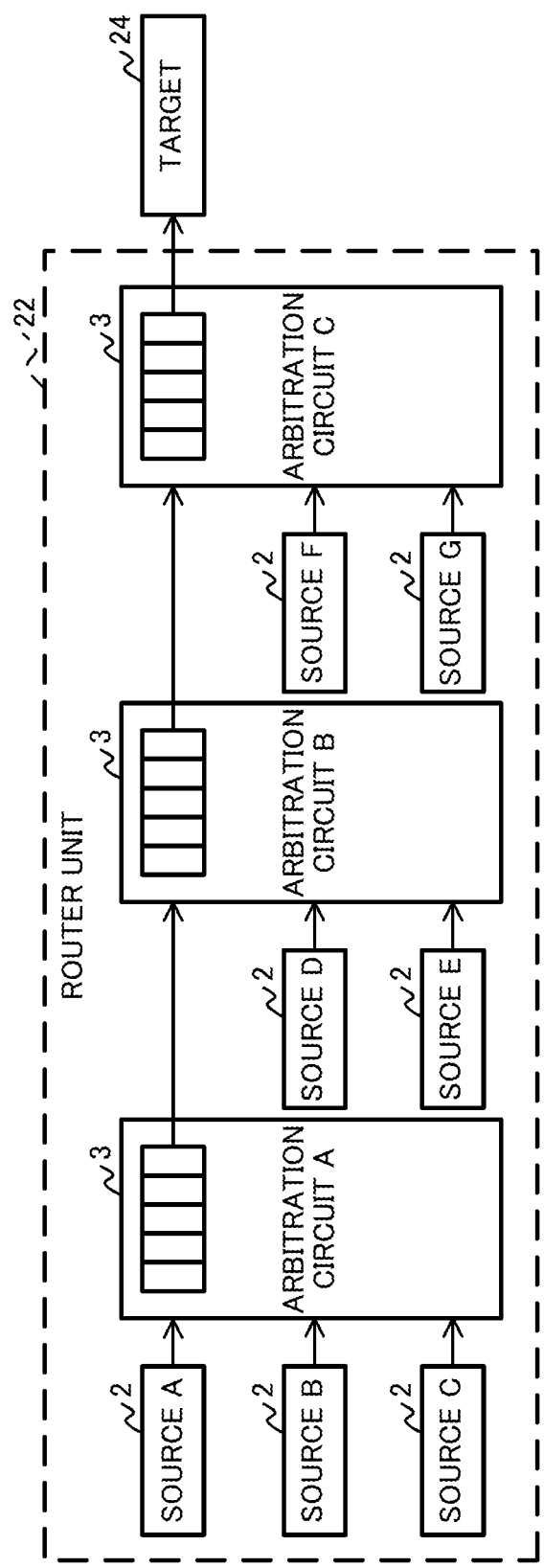
FIG. 9 is a diagram illustrating one example of the router unit depicted in FIG. 4.

If each source 2 provides a maximum number of packets to the arbitration circuits 3 depicted in FIG. 9, the ideal amount of data (bus usage ratio) transferred from each source 2 to the target 24 is one seventh of the total amount, when the ratios are equalized among the seven sources 2. In the timing charts depicted in FIGS. 13 to 15, the packets are transferred to the target 24 in the order of "F0", "D0", "A0", "B0", "C0", "E0", "G0", which is the same as the ideal bus usage ratio and hence it is possible to equalize the bus usage ratios among the sources 2.

(2-3) Exemplary Operations

Next, exemplary operations of the router unit 22 in the CPU 2 configured as described above will be described with reference to FIGS. 16 and 17.

Figure 16:
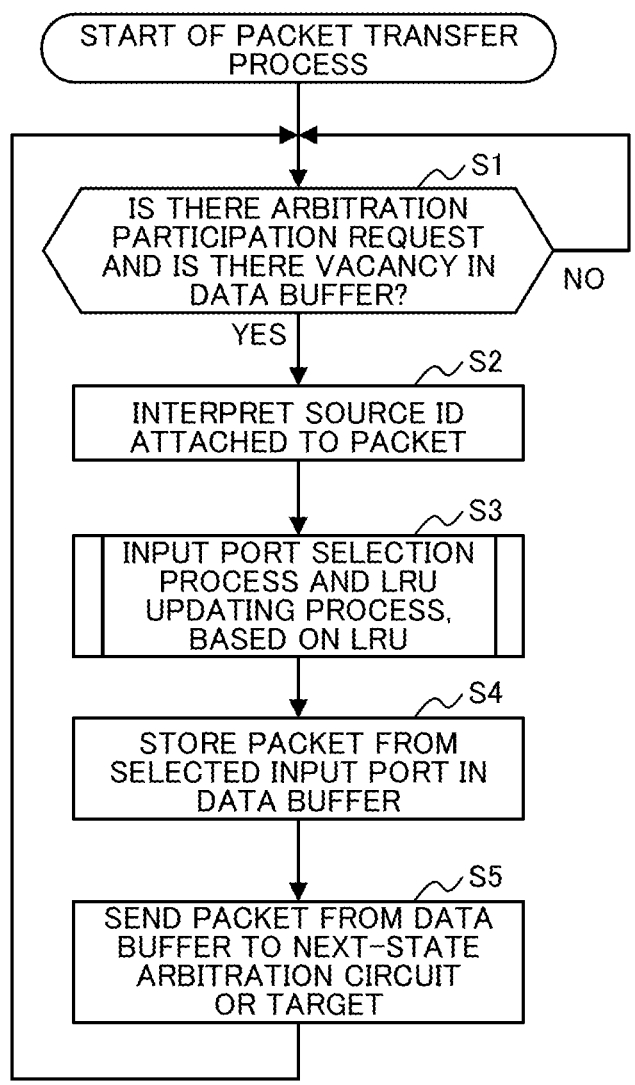
FIG. 16 is a flowchart illustrating one example of a packet transfer process by a router unit in accordance with one embodiment.

First, referring to FIG. 16, one example of a packet transfer process in the router unit 22 will be described. As exemplified in FIG. 16, each arbitration circuit 3 in the router unit 22 (the decode unit 34a) determines whether or not there is an arbitration participation request from any of the input ports 33 and there is any vacancy in the data buffer 32 (Step S1). For example, if there is no input of an arbitration participation signal from any of the input ports 33, or if there is no input of a vacancy notification signal from the resource management unit 31 (the No route from Step S1), the decode unit 34a waits until an arbitration participation signal, a source ID, and a vacancy notification signal are inputted. In this case, the flow transitions to Step S1.

Otherwise, if an arbitration participation signal and a source ID are inputted from input ports 33 and a vacancy notification signal is inputted from the resource management unit 31 (the Yes route from Step S1), the decode unit 34a interprets the source ID attached to a packet (Step S2) and outputs information of the source 2 and the corresponding arbitration participation signal, to the selection unit 34b.

The selection unit 34b makes a reference to the LRU register 34c, based on the information (e.g., source ID) of the source 2 inputted from the decode unit 34a. In this case, the selection unit 34b selects an input port 33, based on the value of the LRU status flag at the bit position corresponding to the source IDs. The selection unit 34b also outputs a priority gained signal indicating the selected input port 33. Furthermore, the selection unit 34b updates the LRU register 34c (Step S3).

The transfer unit 35a then stores a packet from the input port 33 indicated by the priority gained signal, in the buffer 32a in the data buffer 32 (Step S4). After packets are stored in the buffer 32a, the data buffer 32 transmits the packets from the buffer 32a to the respective transfer destinations (the arbitration circuit 3 in the subsequent stage or the target 24), in the order of the time when the packet are stored in the buffer 32a (Step S5) and the flow transitions to Step S1. Note that the processes in Step S1-S5 are executed in each arbitration circuit 3.

Figure 17:
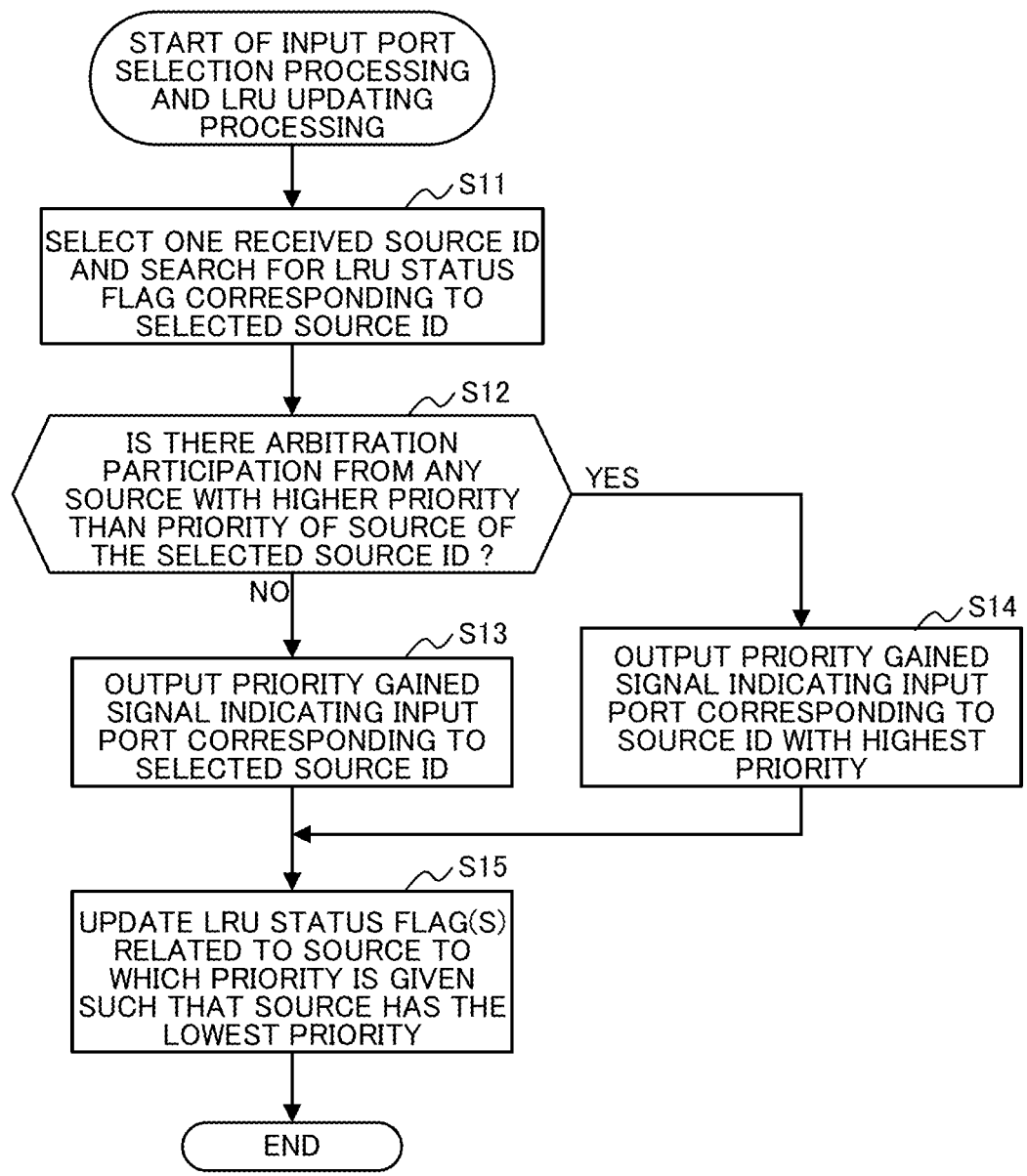
FIG. 17 is a flowchart illustrating one example of an input port selection process and an LRU register update process by the router unit in accordance with one embodiment.

Next, referring to FIG. 17, one example of a selection process of an input port and an update process of the LRU register 34c in the router unit 22 (in Step S3 in FIG. 16) will be described. As exemplified in FIG. 17, the selection unit 34b selects one of source IDs inputted from the decode unit 34a, and searches for the LRU status flag corresponding to the selected source ID in the LRU register 34c (Step S11).

The selection unit 34b then determines whether or not an arbitration participation signal is inputted from a source that has a priority higher than the priority of the source 2 of the selected source ID, based on the selection logic (Step S12).

If no arbitration participation signal is inputted from a source 2 that has a priority higher than the priority of the source 2 of the selected source ID, for example, if the selected source ID has the highest priory in the sources 2 (the No route from Step S12), the flow transitions to Step S13. In Step S13, the selection unit 34b outputs a priority gained signal indicating the input port 33 corresponding to the selected source ID.

Otherwise, if an arbitration participation signal is inputted from a source 2 that has a priority higher than the priority of the source 2 of the selected source ID (the Yes route from Step S12), the selection unit 34b outputs a priority gained signal indicating the input port 33 corresponding to the source ID with the highest priority (Step S14).

The selection unit 34b then causes the LRU register 34c to updated the LRU status flag associated with the source 2 (e.g., causes the value to be inversed) such that the source 2 to which the priority was given, has the lowest priority (Step S15) and the flow is terminated.

Note that the process in Step S15 may be carried out before the selection unit 34b outputs a priority gained signal.

As set forth above, in the information processing apparatus 1 in accordance with one embodiment, upon arbitrating among packets from multiple sources 2 in multiple stages in a CPU 2, by adding identifiers of the sources 2 to the packets, the bus usage ratios among the sources can be equalized with a control of a smaller number of computations.

In the arbitration circuit 220A or 220B depicted in FIG. 1 or FIG. 2, input ports of packets participating in an arbitration are determined based on arbitration participation signals. In contrast, in the arbitration circuits 3 in accordance with one embodiment, sources 2 of packets of input ports 33 can be determined based on source IDs attached to the packets. This enables the arbitration circuits 3 to select an input port 33 corresponding to the source 2 having the highest priority in an arbitration, from input ports 33 receiving packets.

Further, since the CPUs 2 in accordance with one embodiment carry out arbitrations in multiple stages for arbitrating among packets from multiple buses, it is possible to reduce the number of mergers of buses and thus to reduce the circuit size. In this configuration, since each arbitration circuit 3 retains the history for wins/loses in arbitrations for each source 2, the bus usage ratios can be equalized among sources 2 based on the history.

Here, the relationship between the connections of the multiple arbitration circuits 3 in the serial multi-stage arbitration scheme, and the number of bits of LRU status flags retained in each arbitration circuit 3 will be discussed.

FIG. 18 is a diagram illustrating an example of LRU status flags retained in the LRU register 34c in the configuration in which one arbitration circuit 3 arbitrates among seven sources A-G at once.

As depicted in FIG. 18, if the arbitration circuit 3 retains the entire history for wins/loses in arbitrations of all of the sources 2, the number of bits of LRU status flags would increase in proportion to the number of sources 2 and the size of the logic (circuit) of the arbitrator 34 would also be increased.

In contrast, in the arbitration circuit 3 in accordance with one embodiment, the serial multi-stage arbitration scheme eliminates consideration for the order determined in an arbitration in an arbitration circuit 3 in the previous stage. Thus, it is possible to reduce the number of bits of an LRU status flag for each arbitration circuit 3 and to reduce the size of the logic of the arbitrator 34.

As one example, if the seven sources A-G are arbitrated at once and the arbitration circuit 3 retains an LRU status flag for all of the sources 2, the number of bits of an LRU status flag would be calculated as 21 as follows, from the combinations of all of the sources 2:

$_7C_2$=21 bits (refer to FIG. 18)

In contrast, as depicted in FIG. 9, when the sources 2 are divided into three groups for the sources A-C, the sources D and E, and the sources F and G, and are arbitrated in the arbitration circuits A-C connected in series in multiple stages, the number of bits of an LRU status flag retained in each arbitration circuit 3 is calculated as follows, as described above:

First-stage arbitration circuit A: $_3C_2$=3 bits (refer to FIG. 12A).

Second-stage arbitration circuit B: $3\times2+_2C_2=7$ bits (refer to FIG. 12B).

Third-stage arbitration circuit C: $5\times2+_2C_2=11$ bits (refer to FIG. 12C).

As described above, the number of bits of an LRU status flag for the arbitration circuits 3 in the serial multi-stage arbitration scheme is 11 bits (the arbitration circuit C) at maximum, and the number of bits (21 bits) of an LRU status flag in the at-once arbitration scheme is also divided into three parts. Hence, as compared to the configuration in which arbitrations among the multiple sources 2 are managed by one arbitration circuit 3 in a centralized manner, it is possible reduce to the size of the logic of each arbitration circuit 3 (the arbitrator 34), which significantly contributes to a reduction in the circuit size.

(3) Miscellaneous

While a preferred embodiment of the present invention has been described in detail, the present invention is not limited to that particular embodiment and the present invention may be practiced in a wide range of modifications and variations without departing from the scope thereof.

For example, while the router unit 22 includes three arbitration circuits 3 in the examples in FIGS. 5, 9, and 11, this is not limiting and any number of arbitration circuits 3 may be provided.

Furthermore, while each CPU 2 includes one core unit 24 in the example in FIG. 4, this is not limiting and a CPU 2 may include multiple core unit 24. In the latter configuration, information (e.g., packets), such as data and commands, transmitted to another CPU 2 or another apparatus (not illustrated) from the multiple core units 24, may be arbitrated among the multiple core units 24 and the configuration of the above-described router unit 22 may be applied to these arbitrations.

Specifically, the CPU 2 may provide multiple arbitration circuits for the serial multi-stage arbitration scheme, for each core unit 24 as a source and another CPU 2 or another apparatus (not illustrated) as a target, for a communication in the direction opposite to the direction of the multiple arbitration circuits 3 for each target. In such a configuration, each core unit 24 can add its source ID to every packet to be sent. No reference symbol is provided to the arbitration circuits that are applied to the communication in the direction opposite to the direction of the multiple arbitration circuits 3 in the above description for the sake of the brevity. Nevertheless, the functions (configuration) of such arbitration circuits are basically similar to those of the arbitration circuits 3, although the number of the input ports 33 or the total number of stages of the arbitration circuits may be different. While the multiple arbitration circuits 3 for receipt in a CPU 2 have been described in one embodiment, multiple arbitration circuits for transmission from the CPU 2 (multiple core units 24) may also be embodied by switching the sources and the target.

Furthermore, the functional blocks in the arbitration circuits 3 depicted in FIG. 10 may be combined in any combinations or may be divided.

In the meantime, the arbitration circuits 3 in accordance with one embodiment may be practiced in integrated circuits, e.g., large scale integrations (LSIs); or electronic circuits, e.g., application specific integrated circuits (ASICs) and field programmable gate arrays (FPGAs), for example. An arbitration circuit 3 or a router unit 22 having multiple arbitration circuit 3 may be integrated with the core unit 24 or the other components to configure a CPU 2, or may be integrated separately from the core unit 24 or the other components to configure a CPU 2.

While the LRU status flag is a single-bit value and thus the number of sources 2 associated with a single LRU status flag is two in one embodiment, this is not limiting. For example, a single LRU status flag (LRU status information) is a two- or more-bit value and four or more sources 2 may be associated with a single LRU status information. In this configuration, a selection of a source 2 based on the source ID and an update of the LRU register 34*c* by the selection unit 34*b* may be suitably modified according to the number of bits for a single piece of LRU status information.

Furthermore, the first-stage arbitration circuit 3 (e.g., the arbitration circuit A in FIG. 9) may include an LRU register similar to the one that has been used conventionally, in place of the above-described LRU register 34*c*, since it is suffice to arbitrate among packets from sources 2 (e.g., the sources A-C) in an equalized manner and to send the selected packet to the next stage. This is because the first-stage arbitration circuit 3 has no arbitration circuit 3 in the previous stage, and hence an arbitration in the previous stage is not considered.

For example, the LRU register in the first-stage arbitration circuit 3 may retain, for each input port 33, LRU information having a greater (smaller) value for an input port 33 that was selected the most previously, in other words, an input port 33 that has the longest elapsed time after the most previous selection. The LRU information may include, for each input port 33, any of known information, such as information of time (time stamp) of the most previous selection, information of the input ports 33 sorted in the order of the elapsed time after the most previous (most recent) selection.

Furthermore, while a source ID has been described as being attached to a packet by a source 2 that is a sender of the packet, this is not limiting. For example, the source 2 may send a packet that is similar to conventional one, and in a CPU 2 that receives the packet, the arbitration circuit 3 at which the packet from that source 2 is merged in the first time in the router unit 22, may attach the source ID to that packet.

As one example, the arbitration circuit A depicted in FIG. 9 may add source IDs that can be used to identify the sources A-C, to packets from the sources A-C, and may transfer the packets. The arbitration circuit B may then transfer the packets from the sources A-C having the source IDs without making any modification, and may add source IDs that can be used to identify the sources D and E, to packets from the sources D and E, and may transfer the packets. The arbitration circuit C may then transfer the packets from the sources A-E having the source IDs, without making any modification, and may add source IDs that can be used to identify the sources F and G, to packets from the sources F and G, and may transfer the packets.

In this configuration, the decode unit 34*a* can identify packets having no source ID, based on the input ports 33 corresponding to the sources 2 of the packets. LRU status flags may also be associated with the input ports 33 for those sources 2. The transfer unit 35*a* may attach source IDs of sources 2 corresponding to the input ports 33, to packets having no source IDs, for example.

As set forth above, since the arbitration circuits 3 attach a source ID to a packet, it is possible to reduce functions to be added to source 2. This enables conventional sources 2 to be used, and hence the development and manufacturing costs can be reduced.

In one aspect, in an arithmetic processing apparatus that processes data inputted from multiple sources, an increase in the circuit size can be suppressed and the bus usage ratios among the sources can be adjusted appropriately.

All examples and conditional language recited provided herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An arithmetic processing apparatus comprising:
a plurality of selection circuits that are connected in series,
at least one selection circuit of the plurality of selection circuits, the at least one selection circuit being served as a first selection circuit, includes:
a plurality of input units that are connected to a source or a second selection circuit to receive, from the source or the second selection circuit, data and an identifier of a sender of the data, the second selection circuit being a selection circuit of an upstream side connected to the first selection circuit;
a selection unit that selects a first input unit from two or more input units each receiving data and an identifier, based on the two or more identifiers, and priority information indicating respective priorities for a plurality of sources, the plurality of sources being connected independently of one another to any one of the plurality of selection circuits including the first selection circuit and the second selection circuit, the priority information including indications indicating, for each of one or more combinations of the plurality of sources, a source to be selected by the selection unit;
an update unit that updates, in the priority information, a priority for a first source indicated by a first identifier being received by the first input unit; and
a transfer unit that transfers data and the first identifier passed through the first input unit, to a destination.

2. The arithmetic processing apparatus according to claim 1, wherein the one or more combinations include: combinations of one source connected to an upstream selection circuit and one or more sources connected to the first selection circuit; and combinations of two or more sources connected to the first selection circuit, the upstream selection circuit being a selection circuit upstream to the first selection circuit.

3. The arithmetic processing apparatus according to claim 1, wherein the selection unit selects the first source, for one or more combinations of two or more sources indicated by the two or more identifiers, based on one or more indications in the priority information corresponding to the one or more combinations, and selects the first input unit that receives data from the selected first source.

4. The arithmetic processing apparatus according to claim 3, wherein the update unit updates one or more indications in the priority information corresponding to the first source such that a source different from the first source is to be selected by the selection unit among combinations indicated by the indications.

5. An information processing apparatus comprising:
a plurality of arithmetic processing apparatuses,
at least one arithmetic processing apparatus of the plurality of arithmetic processing apparatuses comprising a plurality of selection circuits that are connected in series, and receiving data from a remote arithmetic processing apparatus via the plurality of selection circuits,
at least one selection circuit of the plurality of selection circuits, the at least one selection circuit served as a first selection circuit includes:
a plurality of input units that are connected to the remote arithmetic processing apparatus or a second selection circuit to receive, from the remote arithmetic processing apparatus or the second selection circuit, data and an identifier of a sender of the data, the second selection circuit being a selection circuit of an upstream side connected to the first selection circuit;
a selection unit that selects a first input unit from two or more input units each receiving data and an identifier, based on the two or more identifiers, and priority information indicating respective priorities for a plurality of sources, the plurality of sources being connected independently of one another to any one of the plurality of selection circuits including the first selection circuit and the second selection circuit, the priority information including indications indicating, for each of one or more combinations of the plurality of sources, a source to be selected by the selection unit;
an update unit that updates, in the priority information, a priority for a first source indicated by a first identifier being received by the first input unit; and
a transfer unit that transfers data and the first identifier passed through the first input unit, to a destination.

6. The information processing apparatus according to claim 5, wherein the one or more combinations include: combinations of one remote arithmetic processing apparatus connected to an upstream selection circuit and one or more remote arithmetic processing apparatuses connected to the first selection circuit; and combinations of two or more remote arithmetic processing apparatuses connected to the first selection circuit, the upstream selection circuit being a selection circuit upstream to the first selection circuit.

7. The information processing apparatus according to claim 5, wherein the selection unit selects the first source, for one or more combinations of two or more sources indicated by the two or more identifiers, based on one or more indications in the priority information corresponding to the one or more combinations, and selects the first input unit that receives data from the selected first source.

8. The information processing apparatus according to claim 7, wherein the update unit updates one or more indications in the priority information corresponding to the first source such that a source different from the first source is to be selected by the selection unit among combinations indicated by the indications.

9. A method of controlling an information processing apparatus comprising a plurality of arithmetic processing apparatuses, the method comprising:
receiving, by at least one arithmetic processing apparatus of the plurality of arithmetic processing apparatuses, data from a remote arithmetic processing apparatus via a plurality of selection circuits that are connected in series;
in at least one selection circuit of the plurality of selection circuits, the at least one selection circuit being served as a first selection circuit:

selecting, by a selection unit, a first input unit from two or more input units of a plurality of input units, which receive, from the remote arithmetic processing apparatus or a second selection circuit, data and an identifier of a sender of the data, based on the two or more identifiers, and priority information indicating respective priorities for a plurality of sources, the second selection circuit being a selection circuit of an upstream side connected to the first selection circuit, the plurality of sources being connected independently of one another to any one of the plurality of selection circuits including the first selection circuit and the second selection circuit, the priority information including indications indicating, for each of one or more combinations of a plurality of sources, a source to be selected by the selection unit;

updating, by an update unit, in the priority information, a priority for a first source indicated by a first identifier being received by the first input unit; and transferring, by a transfer unit, data and the first identifier passed through the first input unit, to a destination.

10. The method of controlling according to claim 9, wherein the one or more combinations include: combinations of one remote arithmetic processing apparatus connected to an upstream selection circuit and one or more remote arithmetic processing apparatuses connected to the first selection circuit; and combinations of two or more remote arithmetic processing apparatuses connected to the first selection circuit, the upstream selection circuit being a selection circuit upstream to the first selection circuit.

11. The method of controlling according to claim 9, wherein in the at least one selection circuit, by the selection unit, the first source is selected, for one or more combinations of two or more sources indicated by the two or more identifiers, based on one or more indications in the priority information corresponding to the one or more combinations, and the first input unit that receives data from the selected first source is selected.

12. The method of controlling according to claim 11, wherein one or more indications in the priority information corresponding to the first source is updated by the update unit, such that a source different from the first source is to be selected by the selection unit among combinations indicated by the indications.

* * * * *